United States Patent

[11] 3,628,221

| [72] | Inventor | Max Pasbrig<br>Casa Luce-Via all'Eco, Orselina,<br>Switzerland |
|---|---|---|
| [21] | Appl. No. | 820,410 |
| [22] | Filed | Apr. 30, 1969 |
| [45] | Patented | Dec. 21, 1971 |
| [32] | Priority | May, 2, 1968, July 17, 1968, July 17, 1968,<br>July 17, 1968, May 22, 1968 |
| [33] | | Germany, Germany, Germany, Germany,<br>Great Britain |
| [31] | | P 12 80 369.9, P 17 65 781.7; P 17 65 784.0;<br>P 17 65 782.8; 24,444/68 |

[54] DEVICE FOR CLAMPING AND TIGHTENING
CABLES AND THE LIKE
31 Claims, 73 Drawing Figs.

[52] U.S. Cl.................................................. 24/126 L,
24/136 B, 24/194, 226/147, 226/167, 254/73,
339/247
[51] Int. Cl........................................................F16g 11/00,
A44b 11/10
[50] Field of Search............................................24/126, 126
K, 126 L, 126 A, 126 B, 126 C, 126.1, 126.2,
126.3, 136, 136 A, 136 B, 136 L, 171, 194, 264,
268; 254/134.3; 294/19; 226/147, 151, 167,
162–164

[56] References Cited
UNITED STATES PATENTS

| 1,719,182 | 7/1929 | Johansen...................... | 24/136 |
|---|---|---|---|
| 1,921,627 | 8/1933 | Lucchesi...................... | 24/126 UX |
| 2,033,227 | 3/1936 | Brown.......................... | 24/136 UX |
| 2,374,875 | 5/1945 | McMurphy.................... | 24/126 |
| 2,412,097 | 12/1946 | Russell........................ | 24/136 |
| 2,529,327 | 11/1950 | Carlson........................ | 24/126 |
| 2,539,333 | 1/1951 | Silbermann................... | 24/126 UX |
| 2,834,112 | 5/1958 | Seagraves..................... | 24/126 X |
| 3,376,545 | 4/1968 | Anzini.......................... | 24/126 X |
| 3,424,038 | 1/1969 | Smith........................... | 24/126 X |
| 3,474,389 | 10/1969 | Nagano........................ | 24/126 X |

FOREIGN PATENTS

| 834,735 | 11/1938 | France........................ | 24/126 |

Primary Examiner—Stanley N. Gilreath
Assistant Examiner—Werner H. Schroeder
Attorney—Stevens, Davis, Miller & Mosher ABSTRACT: The invention relates to a device for detachably connecting, fixing and tightening connecting elements, particularly electric cables, wire ropes, chains, belts and the like. The device consists of a housing equipped with a recess with wedge-shaped clamping surfaces against which at least one spring-loaded clamping member tightens at least one associated connecting element. The connecting element passes rectilinearly through the housing and may be fitted thereinto from the side. A sleeve or bush is provided for releasing the clamping effect, is displaceable on the housing and surrounds the same wholly or partially. The clamping device may be constructed as a closure in which case the connecting element has a pan-shaped configuration.

INVENTOR:
MAX PASBRIG

BY: Stevens, Davis, Miller & Mosher
ATTORNEYS

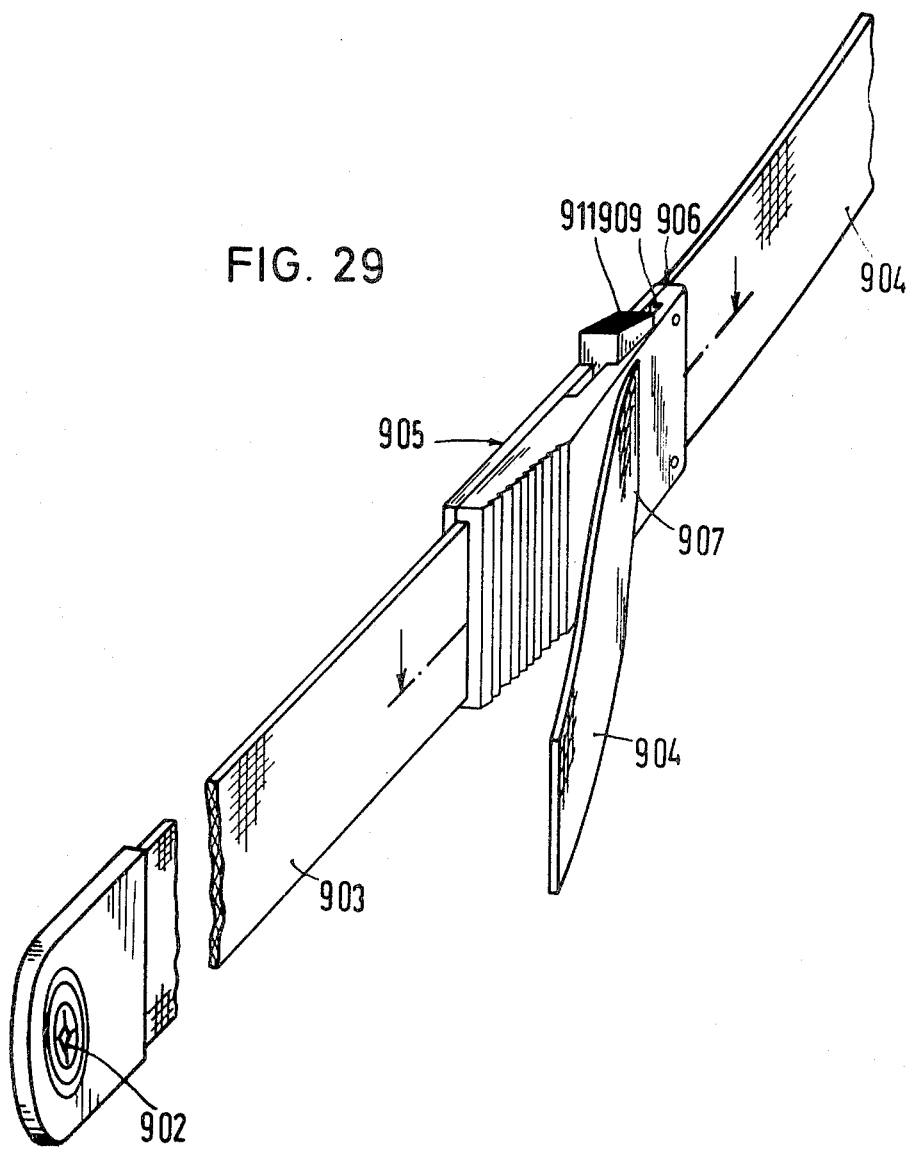

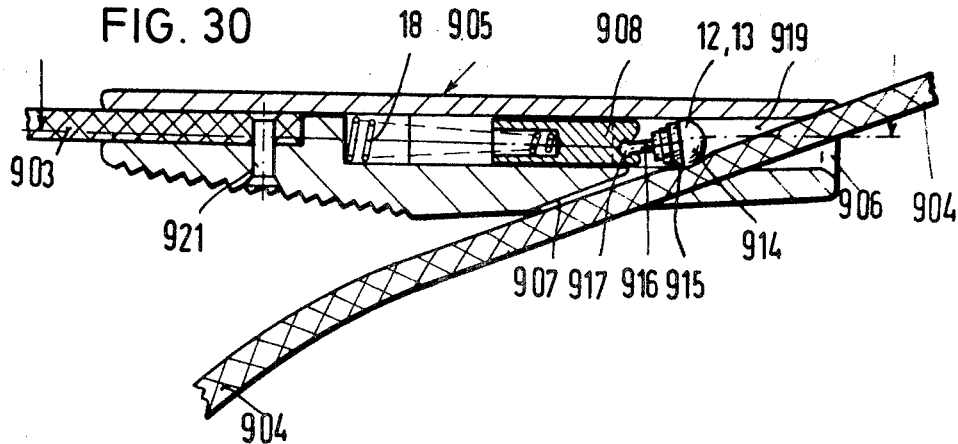
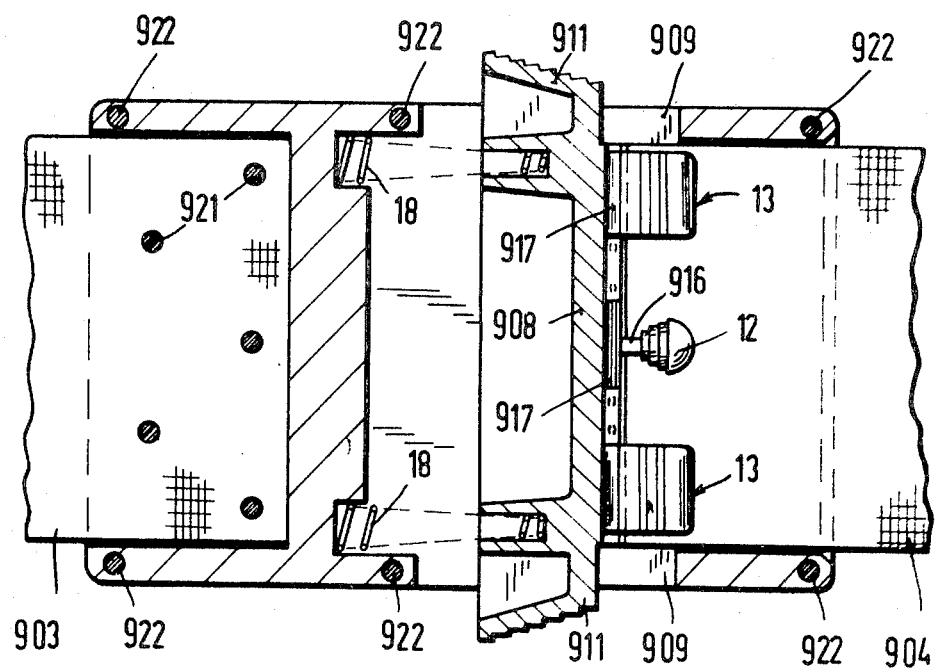

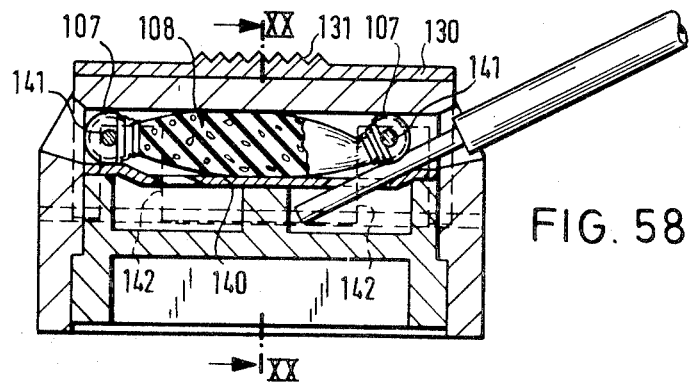
FIG. 58
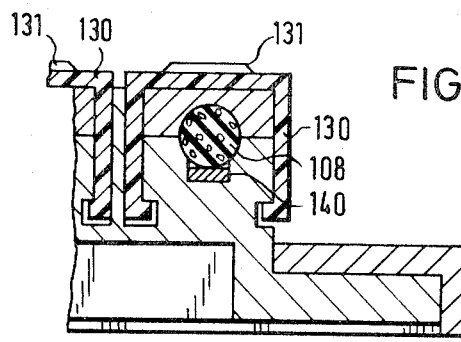
FIG. 59
FIG. 60a
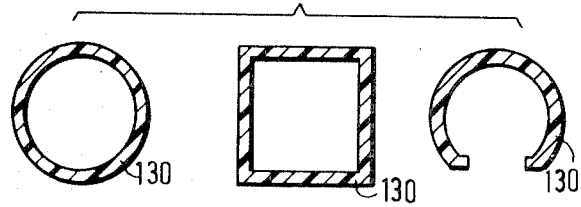

DEVICE FOR CLAMPING AND TIGHTENING CABLES AND THE LIKE

RELATED APPLICATIONS

The applicant's prior application Ser. No. 700,933 filed Jan. 26, 1968, now U.S. Pat. No. 3,551,883 describes a device for detachably clamping connecting elements, in which a connecting element is releasably clamped in a recess of the housing by wedge action exerted by an associated drop-shaped clamping member. An associated compression spring presses the clamping member against the connecting element. A tensile force acting on the connecting element tilts the clamping member and presses it into wedge-shaped clamping surfaces of the housing, thereby increasing the clamping effect. This has the advantage that the clamping effect increases in proportion to the tensile force acting on the connecting element, providing complete security against slipping. The tilting of the clamping body into the clamping position increases the contact surface between the clamping body and the connecting element and this contributes further to preventing slipping thereof.

Another prior application (Ser. No. 785,921 filed Dec. 23, 1968) of the present applicant describes an electric clamping and contact device, comprising one or more spring-loaded clamping elements in a housing. Electric conductors introduced through one or several openings in the housing are retained in a self-locking manner by the associated clamping elements which are tilted into the clamping position when the conductor is affected by tensile forces.

DESCRIPTION

The invention has the object of improving the clamping devices according to the precited prior applications, particularly in the following points:

The connecting element or elements should pass rectilinearly through the housing;

the housing should be such that an endless connecting element can be fitted thereinto from one side;

a tensioning mechanism should be so associated with the clamping device that large tensioning forces can be applied by hand in an effortless manner, enabling, more particularly, tensioning towards both sides;

The handle serving to release the clamping action should be improved, comprising particularly a complete cover of the whole clamping connection towards the outside and the provision of a security against accidental release.

According to this invention, the recess adapted to receive the connecting element and the spring-loaded clamping element, consists of a continuous cylindrical bore for the connecting element, and a lateral, and more particularly oblique cavity for the spring-loaded clamping body.

In a preferred embodiment, the said continuous bore for receiving the connecting element has a lateral, continuous slot, making possible the insertion of a continuous connecting element from the side.

The cavity for receiving and guiding the spring-loaded clamping body may be a blind bore extending obliquely relative to the continuous cylindrical bore.

Preferably, the slot for fitting the endless connecting element from the side is adapted to be closed or is equipped with a labyrinthlike wall.

According to yet another feature of the invention, the actuation, i.e., the release of the clamping body, is effected by means of a bush wholly or partially surrounding the housing, and connecting by connecting means with the clamping body or the compression spring associated therewith. The connecting means may consist of a pin.

In another preferred embodiment of the invention, the bush is adapted to be shifted on the housing between two positions, in one of which a spoon-shaped connecting element, clamped by the clamping body, is released, while in the other position the bush secures this connecting element against being tilted out of the clamping position. Preferably, the compression spring associated with the clamping element consists of an elastic solid material, such as sponge rubber.

In yet another preferred embodiment, clamping body and associated compression spring (helical spring) are made integrally of plastic and more particularly of polyvinyl chloride.

Preferably, the clamping body consists of a hollow pressure and/or bending element. The clamping body may be connected integrally with the compression spring, having the form of a leaf spring, which is of special advantage for electrical plug-in connections. Advantageously, locking and securing hooks are connected to the leaf spring.

In yet a further preferred embodiment there are provided two facing clamping bodies, mounted with a symmetrical, substantially U-shaped, electrically conducting leaf spring movably in the housing, wherein the ends of the leaf spring locate the clamping bodies tiltably about a housing abutment and make contact through a hook and/or other element each with an electric conductor.

Further features and advantages of the invention will become apparent from the following description of preferred embodiment with reference to the accompanying drawings, and from the appended claims. In the drawings:

FIG. 1 shows securing an electric cable to a mast;
FIG. 2 is a first embodiment of a clamping device;
FIG. 3 is a cross section along the line III—III in FIG. 2;
FIG. 4 is an axial cross section along the line IV—IV in FIG. 3;
FIG. 5 is a cross section similar to that in FIG. 4, but showing a modified clamping device;
FIG. 6 is a cross section along the line VI—VI in FIG. 5;
FIG. 7 is a cross section along the line VII,VII in FIG. 4;
FIG. 8 shows a further embodiment, in which the insertion slot is adapted to be closed by a cover;
FIG. 9 shows the FIG. 8 embodiment in the closed state;
FIG. 10 shows a further embodiment with curved insertion slot;
FIG. 11 shows a further embodiment;
FIG. 12 shows a pushover bush;
FIG. 13 shows an embodiment with fitted pushover and covering bush or sleeve;
FIG. 14 shows a construction similar to FIG. 13 with a modified covering bush;
FIG. 15 shows an embodiment enabling the tensioning and fixing of a cable affected by tension in both directions;
FIG. 16 is a perspective view of a first embodiment with a retensioning device;
FIG. 17 is a side elevation partially in section showing two operating positions, including the retensioning device;
FIG. 18 is a clamping device with a second embodiment of a retensioning device;
FIG. 19 is a side elevation partially in section of the embodiment of FIG. 18;
FIG. 20 is a side elevation partially in section of the embodiment of FIG. 18, cut along another plane;
FIG. 21 shows in partial cross section a clamping device with a third embodiment of a retensioning device;
FIG. 22 shows a modification of FIG. 21;
FIG. 23 shows a further modification of FIG. 21 in perspective;
FIG. 24 shows a roller-shaped clamping element in perspective;
FIG. 25 shows a fourth embodiment of a retensioning device;
FIG. 26 shows a fifth embodiment of a retensioning device, partially in cross section;
FIG. 27 shows a sixth embodiment of a retensioning device;
FIG. 28 is a first embodiment of a safety belt according to the invention in cross section;
FIG. 29 shows a safety belt;
FIG. 30 is a longitudinal cross section of the embodiment of FIG. 29;
FIG. 31 is a further cross section of the embodiment of FIG. 29;

FIG. 36b is a cross section of the embodiment of FIG. 36a;

FIG. 58 is a cross section of a further preferred embodiment;

FIG. 59 is a cross section of the embodiment shown in FIG. 58;

Figure 1:
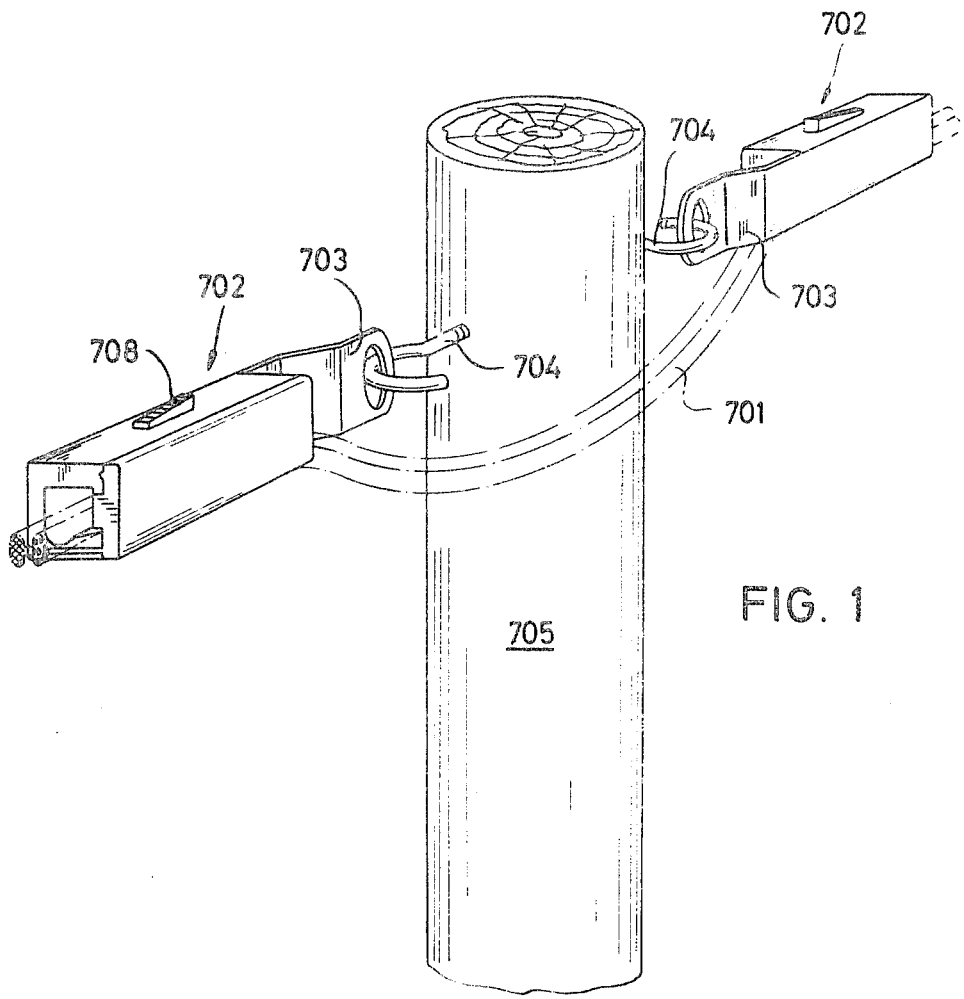

A long telephone cable 701 can be tensioned with clamping devices 702, equipped with lugs 703, as shown in FIG. 1. The lugs 703 may be hooked into hooks 704 which are screwed into a mast 705. The cable 701 may be a twin cable, one part being equipped with a wire cable and taking up the tensile forces, whilst the other carries the telephone wires.

The clamping devices 702 used for tensioning the cable 701 are so constructed that the cable can be fitted from one side. Thus, it is not necessary for one or the other end of the cable to be accessible. This arrangement substantially facilitates the mounting of cables reeled up on drums. A slide member 708 serves to release the clamping lock.

Figure 2:
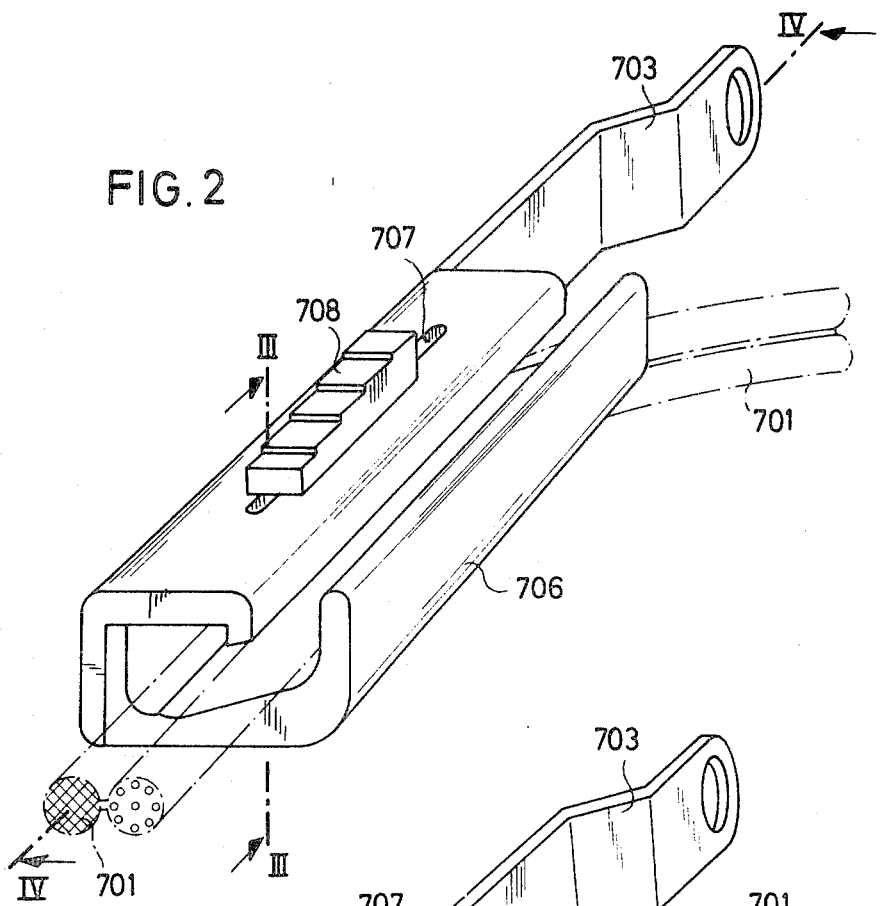
Figure 3:
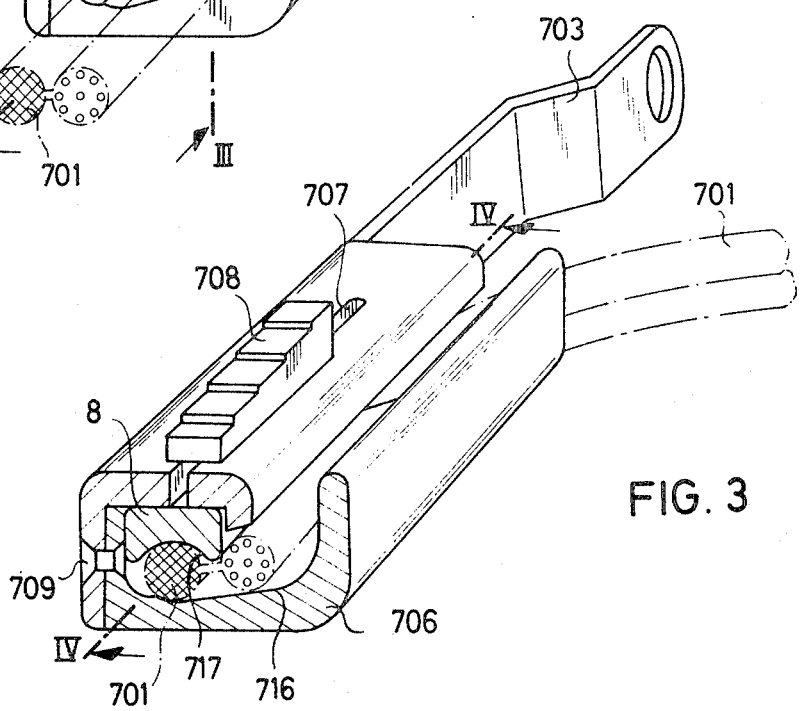
Figure 4:
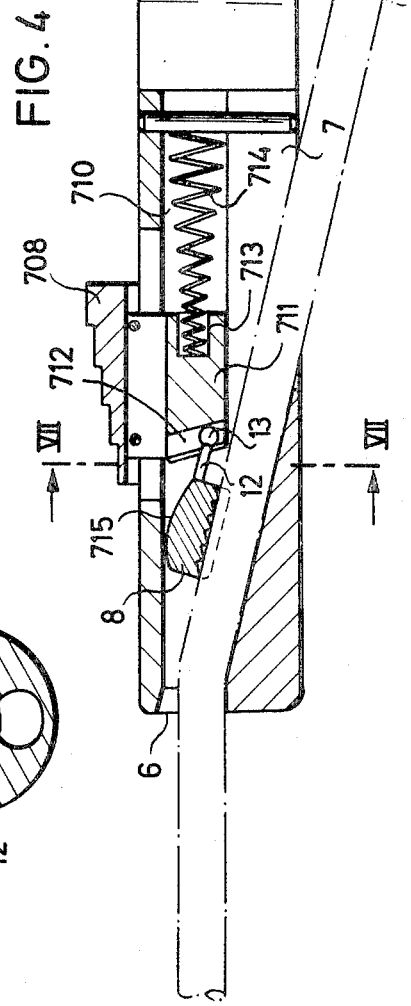

In the embodiment of FIGS. 2 to 4, the clamping device consists of a profiled member 706 with G-shaped cross section, forming a housing and having on its upper side a slot 707 with an operating slide adapted to slide therein. The body 706 may be made in two parts which are riveted together. Inside the body 706, there is a chamber 710 in which sides a slide member 711 connected with the actuating slide 708; the end face of the slide member is chamfered and has a slot-shaped bearing pan 712 and on its other end a mounting 713 for a helical spring 714. A flat clamping body 8 with a bulging back 715 is connected via a neck portion 12 with a spherical end member 13 which is located in the bearing pan 712; the cross section of the bearing pan 712 is larger than that of the spherical end 13 so that the latter can move with play up and down in the bearing pan.

When the cable 701 is fitted into the profiled opening of the sleeve 706 and the actuating slide 708 is pushed back against the force of the spring 714, the cable 701 slides along a sloping surface under the clamping member 8. The lower surface of the clamping member 8 is concave as at 717 (FIG. 3). When the actuating slide 708 is released, the clamping member rests with its concave lower surface 717 on the surface of the cable 701, tilts under the tension exerted on the cable and locks the same in position. The concave portion 717 prevents the cable from escaping through the open side of the profile.

The tensioned strand of the cable 701 enters therefore through the end opening 6 into the sleeve 706, while the relieved strand of the cable leaves through the oblique bore 7. However, as with all slotted embodiments, the inner bore of the sleeve or bush 706 may be so large as to receive the cable 701 and the spring 714 acting on the clamping member 8 so that the cable can leave towards the rear parallel with the operating direction of the compression spring.

Figure 5:
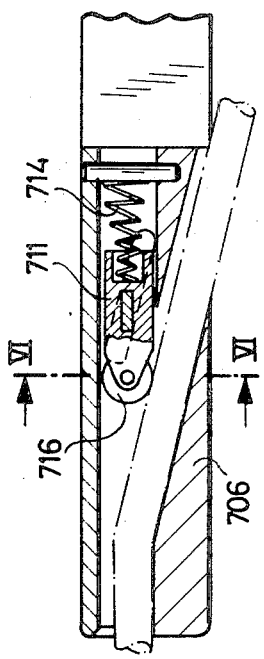
Figure 6:
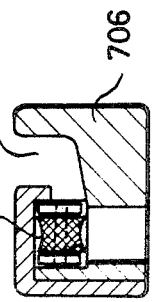

In the modification shown in FIGS. 5 and 6, the clamping member has the shape of a roller 716, mounted rotatably on the slide member 711. The ends of the roller 716 have a larger diameter than its center, adapting it to the diameter of the cable and preventing the same from escaping. Also, as shown in FIG. 6, the roller has a double serration which ensures the reliable locking action in spite of the rotatability of the roller.

Figure 7:
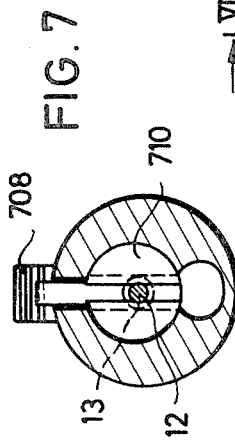

FIG. 7 shows more clearly, the vertical mobility of the spherical end 13 in the slide 711. This ensures the tilting action of the clamping member 8 under full utilization of the cross section 710 of the inner bore of the sleeve.

Figure 8:
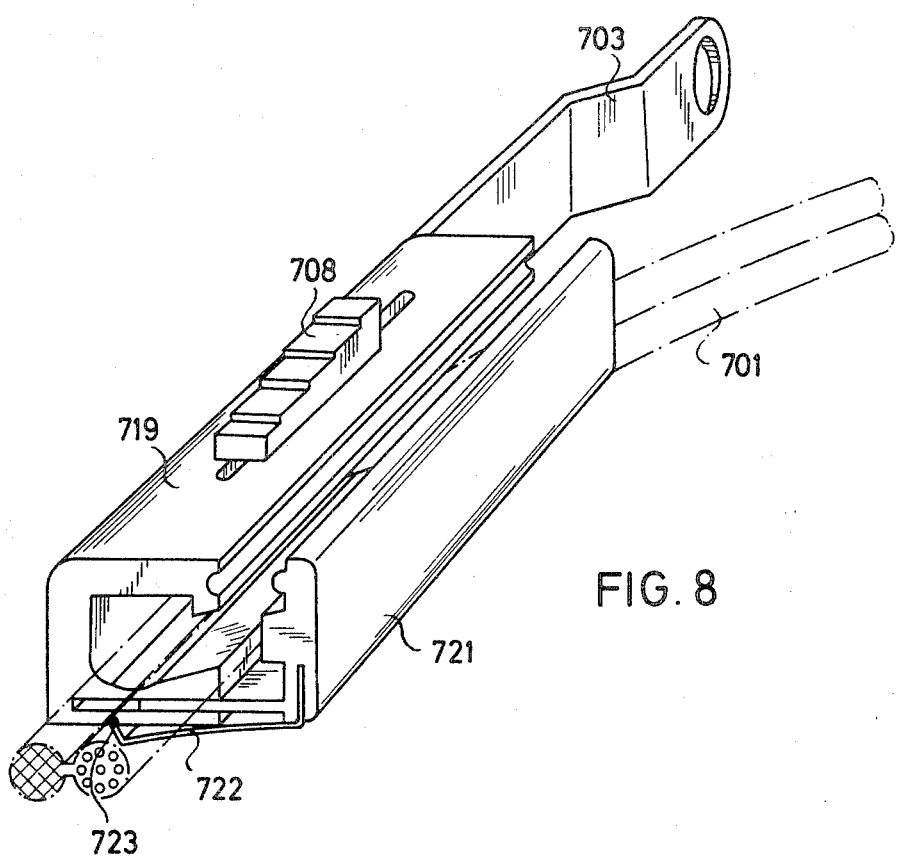
Figure 9:
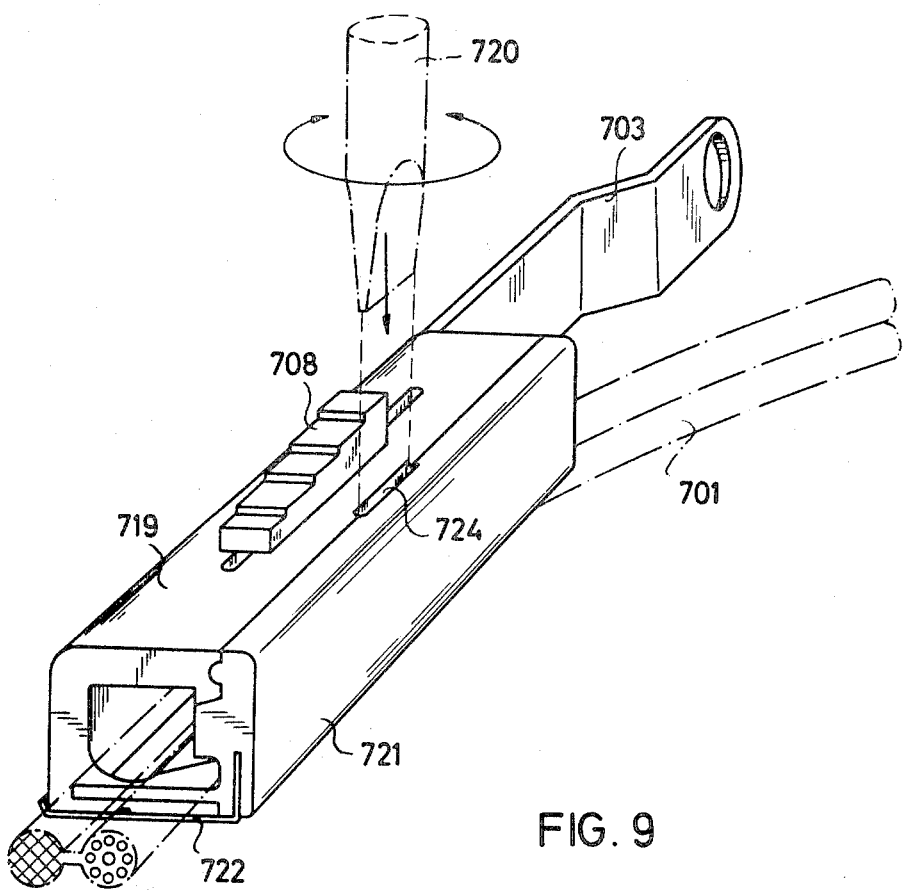

In the embodiment shown in FIGS. 8 and 9, the clamping device consists of a housing part 719 with substantially U-shaped cross section. One leg of this part 719 is longitudinally slotted and is adapted to receive a substantially L-shaped sliding cover 721. A leaf spring 722 rests with its end in a groove 723, in the open position shown in FIG. 8. In the closed position, it rests on the outside of the U-shaped part 719. When the cable 701 is to be fitted or removed, a tool is inserted into a slot 724, and the cover can be moved into the open position (FIG. 8) by turning the tool.

Figure 10:
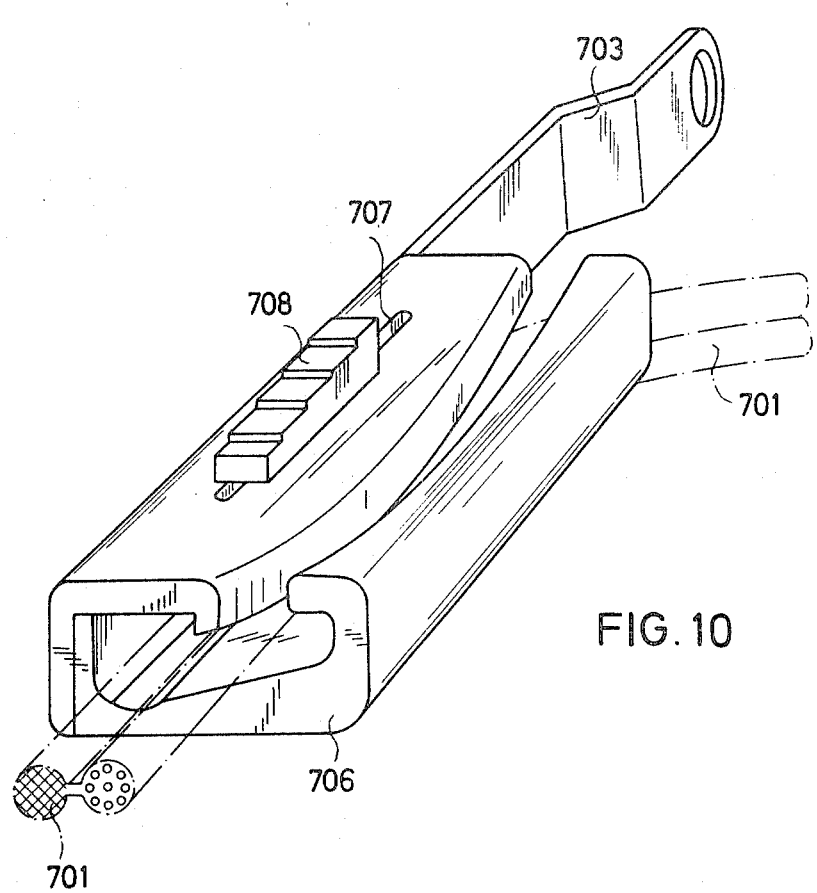

FIG. 10 shows a modification of the embodiment of FIG. 3. The slotted opening for fitting the cable is curved to prevent reliably an accidental escape of the cable 701.

Figure 11:
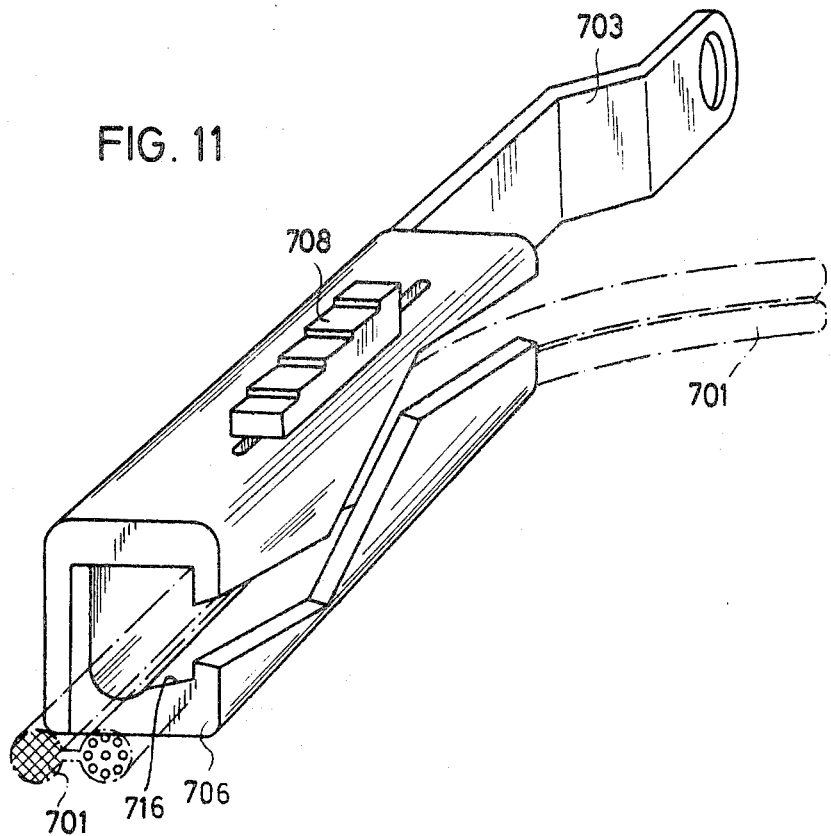

FIG. 11 shows a further modification in which the same object is realized by the labyrinth shaped configuration of the slot.

Figure 12:
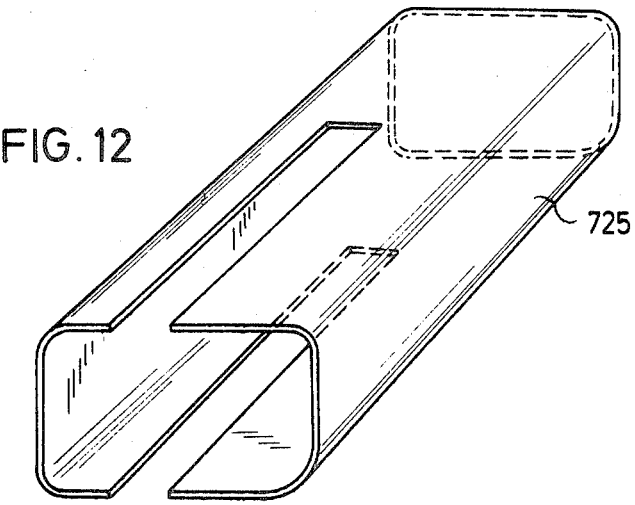

A sleeve 725, such as shown in FIG. 12, may serve for closing the slot used for fitting the cable 701 and for improving the mechanical strength.

Figure 13:
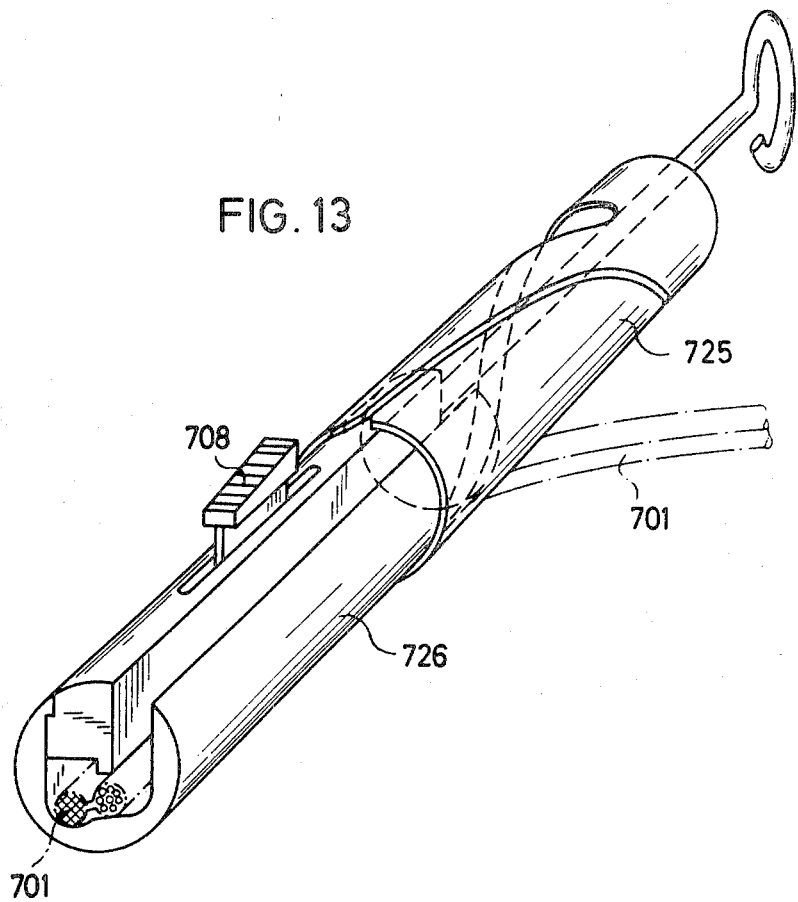

FIG. 13 shows an embodiment using a round bush 726 and a corresponding cylindrical sleeve 725. During the fitting the sleeve 725 is rotated, ensuring the reliable closure of the opening.

Figure 14:
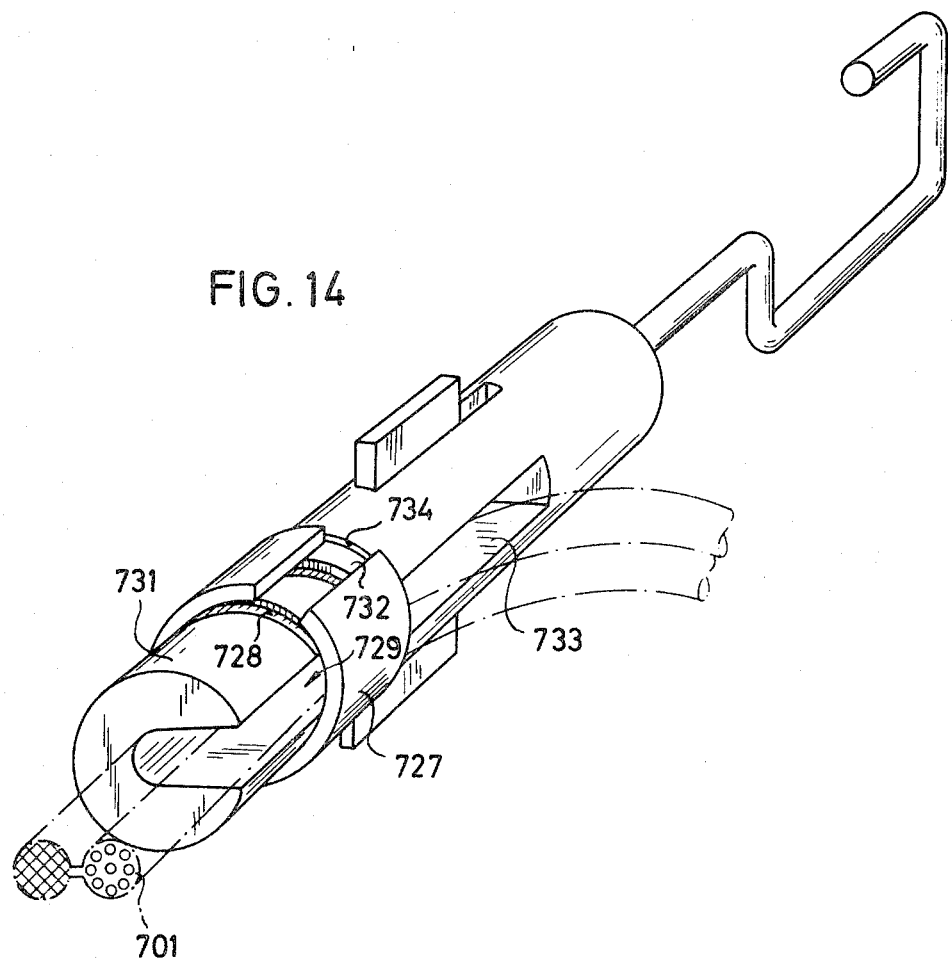

In the embodiment of FIG. 14 the escape of the cable 701 is prevented by a sleeve ring 727 which also serves to prevent loss of the clamping member 8. The sleeve ring 727 is guided

DEVICE FOR CLAMPING AND TIGHTENING CABLES AND THE LIKE

RELATED APPLICATIONS

The applicant's prior application Ser. No. 700,933 filed Jan. 26, 1968, now U.S. Pat. No. 3,551,883 describes a device for detachably clamping connecting elements, in which a connecting element is releasably clamped in a recess of the housing by wedge action exerted by an associated drop-shaped clamping member. An associated compression spring presses the clamping member against the connecting element. A tensile force acting on the connecting element tilts the clamping member and presses it into wedge-shaped clamping surfaces of the housing, thereby increasing the clamping effect. This has the advantage that the clamping effect increases in proportion to the tensile force acting on the connecting element, providing complete security against slipping. The tilting of the clamping body into the clamping position increases the contact surface between the clamping body and the connecting element and this contributes further to preventing slipping thereof.

Another prior application (Ser. No. 785,921 filed Dec. 23, 1968) of the present applicant describes an electric clamping and contact device, comprising one or more spring-loaded clamping elements in a housing. Electric conductors introduced through one or several openings in the housing are retained in a self-locking manner by the associated clamping elements which are tilted into the clamping position when the conductor is affected by tensile forces.

DESCRIPTION

The invention has the object of improving the clamping devices according to the precited prior applications, particularly in the following points:

The connecting element or elements should pass rectilinearly through the housing;

the housing should be such that an endless connecting element can be fitted thereinto from one side;

a tensioning mechanism should be so associated with the clamping device that large tensioning forces can be applied by hand in an effortless manner, enabling, more particularly, tensioning towards both sides;

The handle serving to release the clamping action should be improved, comprising particularly a complete cover of the whole clamping connection towards the outside and the provision of a security against accidental release.

According to this invention, the recess adapted to receive the connecting element and the spring-loaded clamping element, consists of a continuous cylindrical bore for the connecting element, and a lateral, and more particularly oblique cavity for the spring-loaded clamping body.

In a preferred embodiment, the said continuous bore for receiving the connecting element has a lateral, continuous slot, making possible the insertion of a continuous connecting element from the side.

The cavity for receiving and guiding the spring-loaded clamping body may be a blind bore extending obliquely relative to the continuous cylindrical bore.

Preferably, the slot for fitting the endless connecting element from the side is adapted to be closed or is equipped with a labyrinthlike wall.

According to yet another feature of the invention, the actuation, i.e., the release of the clamping body, is effected by means of a bush wholly or partially surrounding the housing, and connecting by connecting means with the clamping body or the compression spring associated therewith. The connecting means may consist of a pin.

In another preferred embodiment of the invention, the bush is adapted to be shifted on the housing between two positions, in one of which a spoon-shaped connecting element, clamped by the clamping body, is released, while in the other position the bush secures this connecting element against being tilted out of the clamping position. Preferably, the compression spring associated with the clamping element consists of an elastic solid material, such as sponge rubber.

In yet another preferred embodiment, clamping body and associated compression spring (helical spring) are made integrally of plastic and more particularly of polyvinyl chloride.

Preferably, the clamping body consists of a hollow pressure and/or bending element. The clamping body may be connected integrally with the compression spring, having the form of a leaf spring, which is of special advantage for electrical plug-in connections. Advantageously, locking and securing hooks are connected to the leaf spring.

In yet a further preferred embodiment there are provided two facing clamping bodies, mounted with a symmetrical, substantially U-shaped, electrically conducting leaf spring movably in the housing, wherein the ends of the leaf spring locate the clamping bodies tiltably about a housing abutment and make contact through a hook and/or other element each with an electric conductor.

Figure 15:
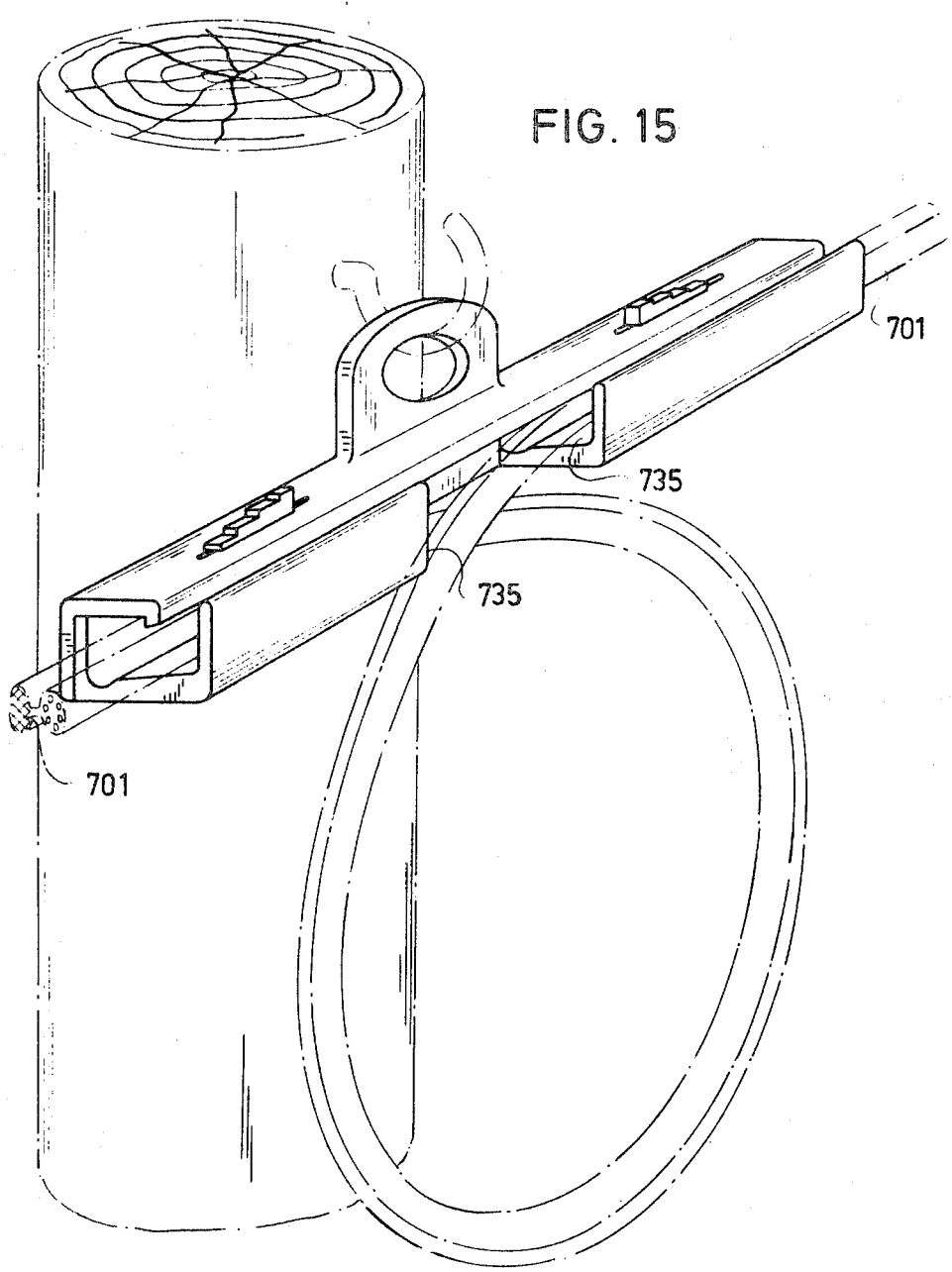
Figure 16:
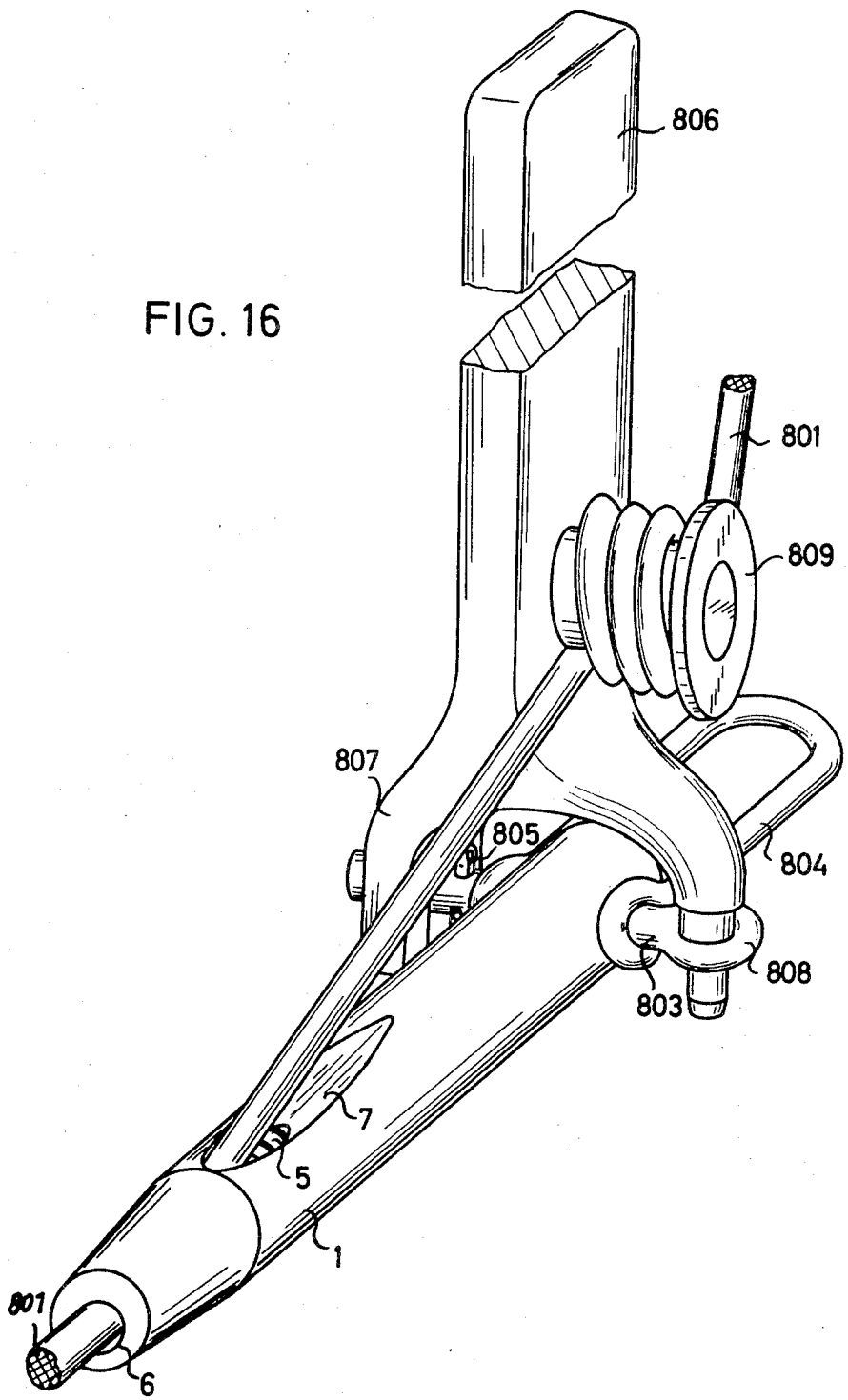
Figure 17:
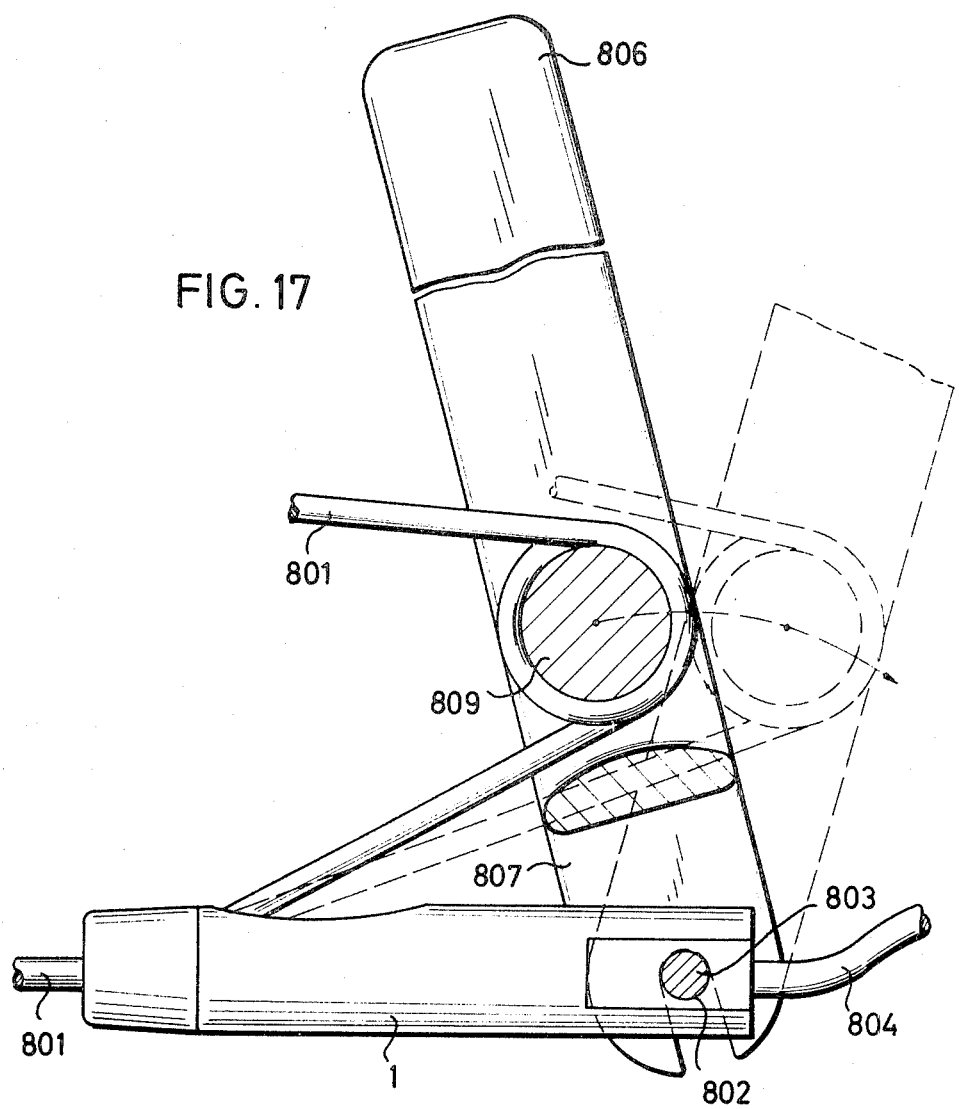
Figure 18:
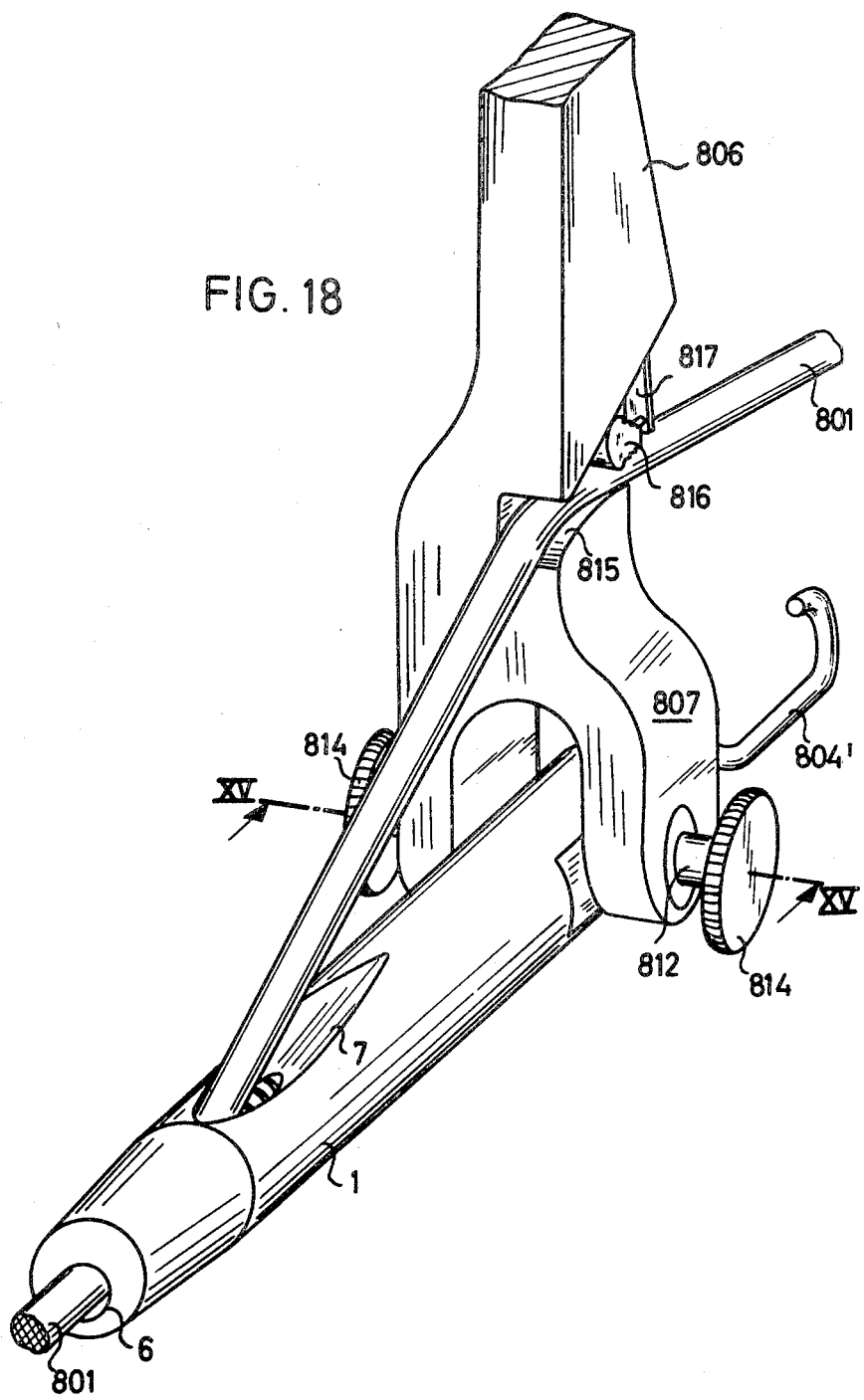
Figure 19:
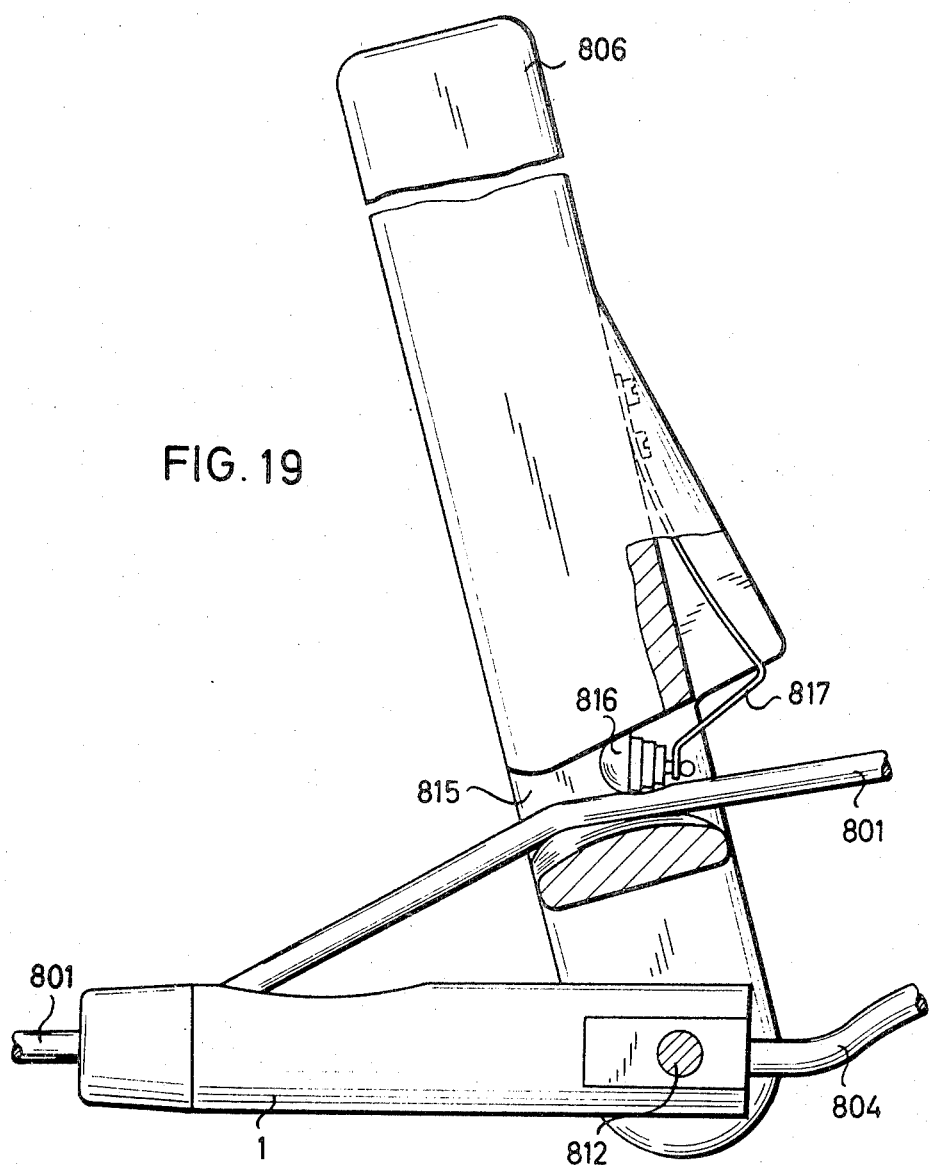
Figure 20:
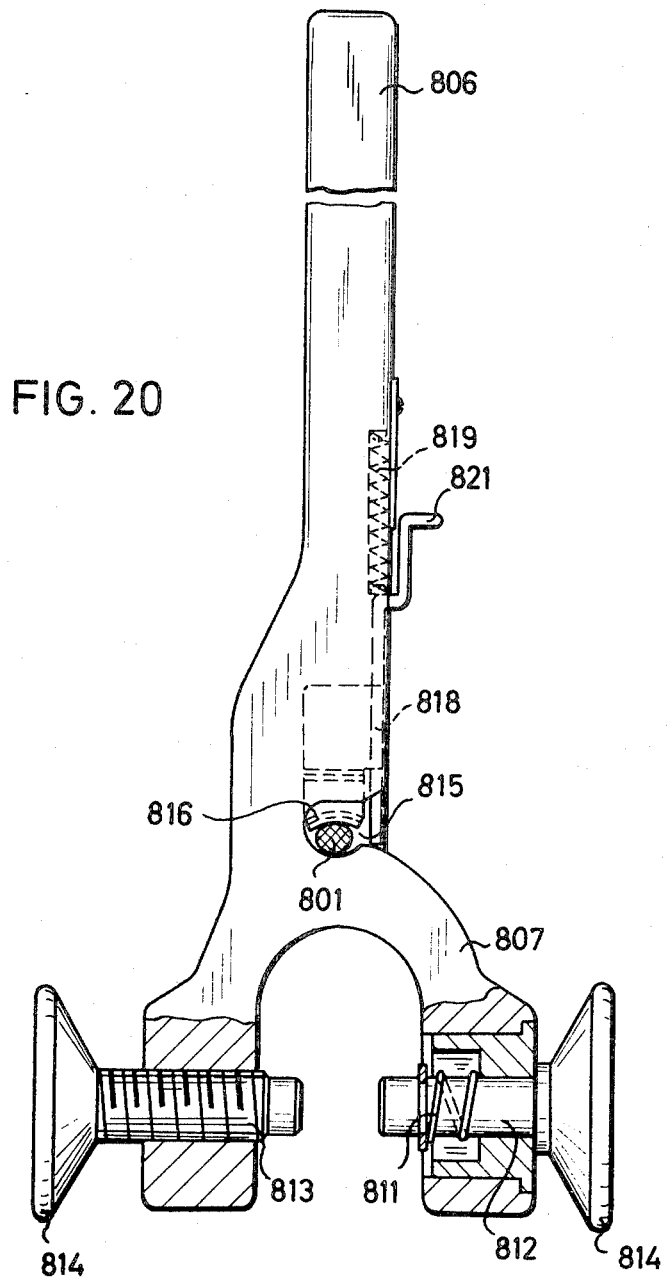
Figure 21:
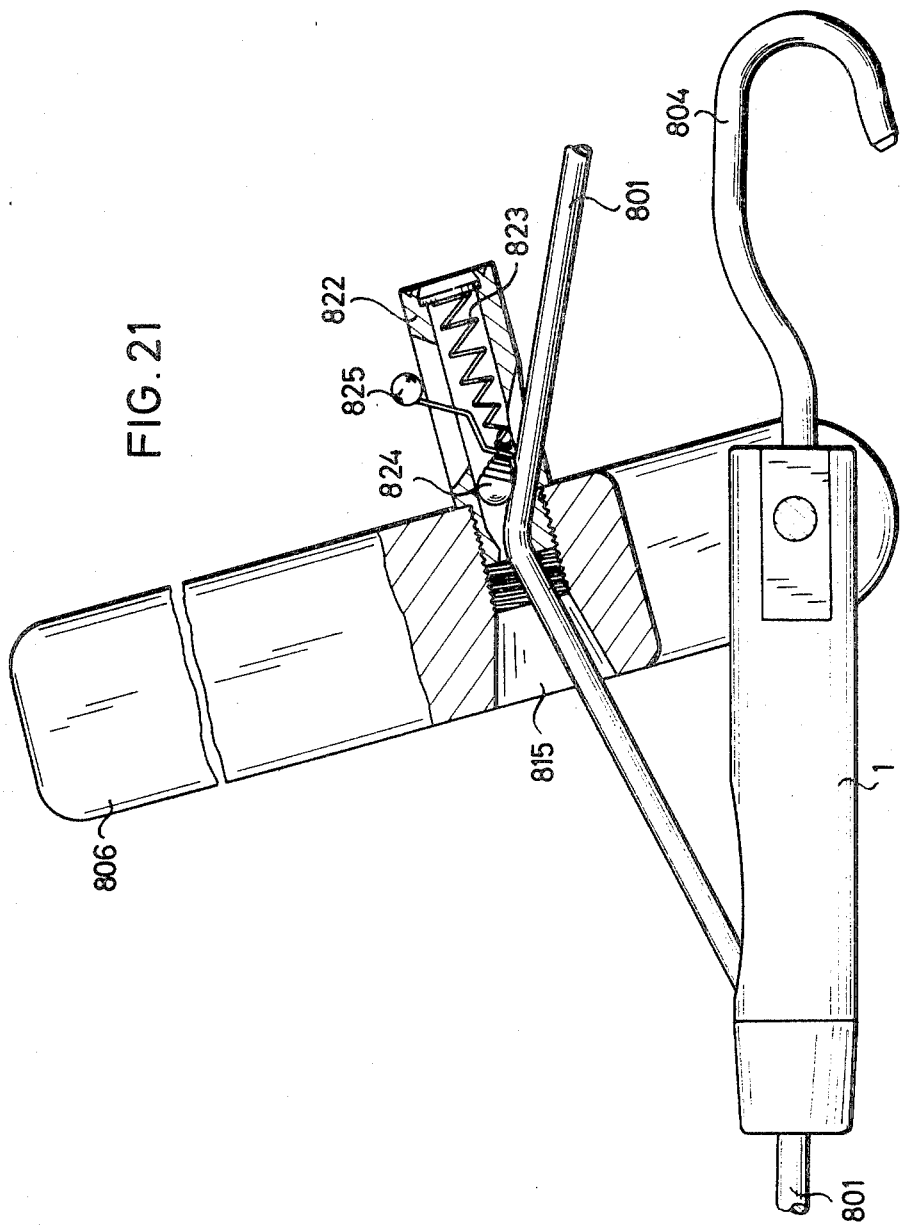
Figure 22:
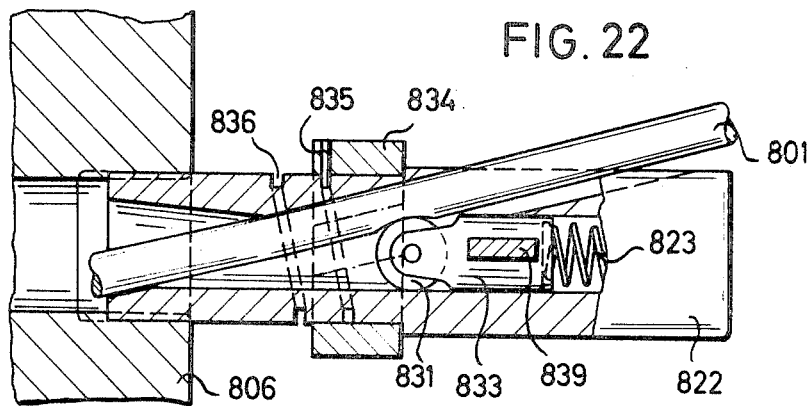
Figure 23:
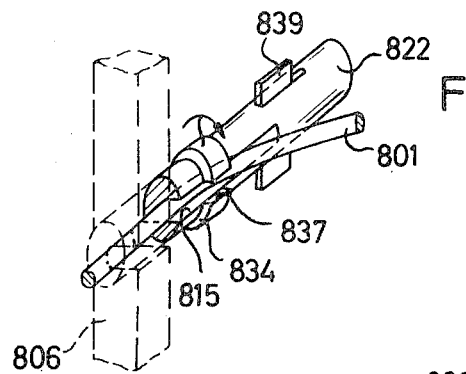
Figure 24:
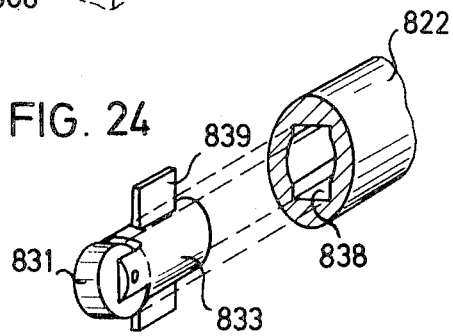
Figure 25:
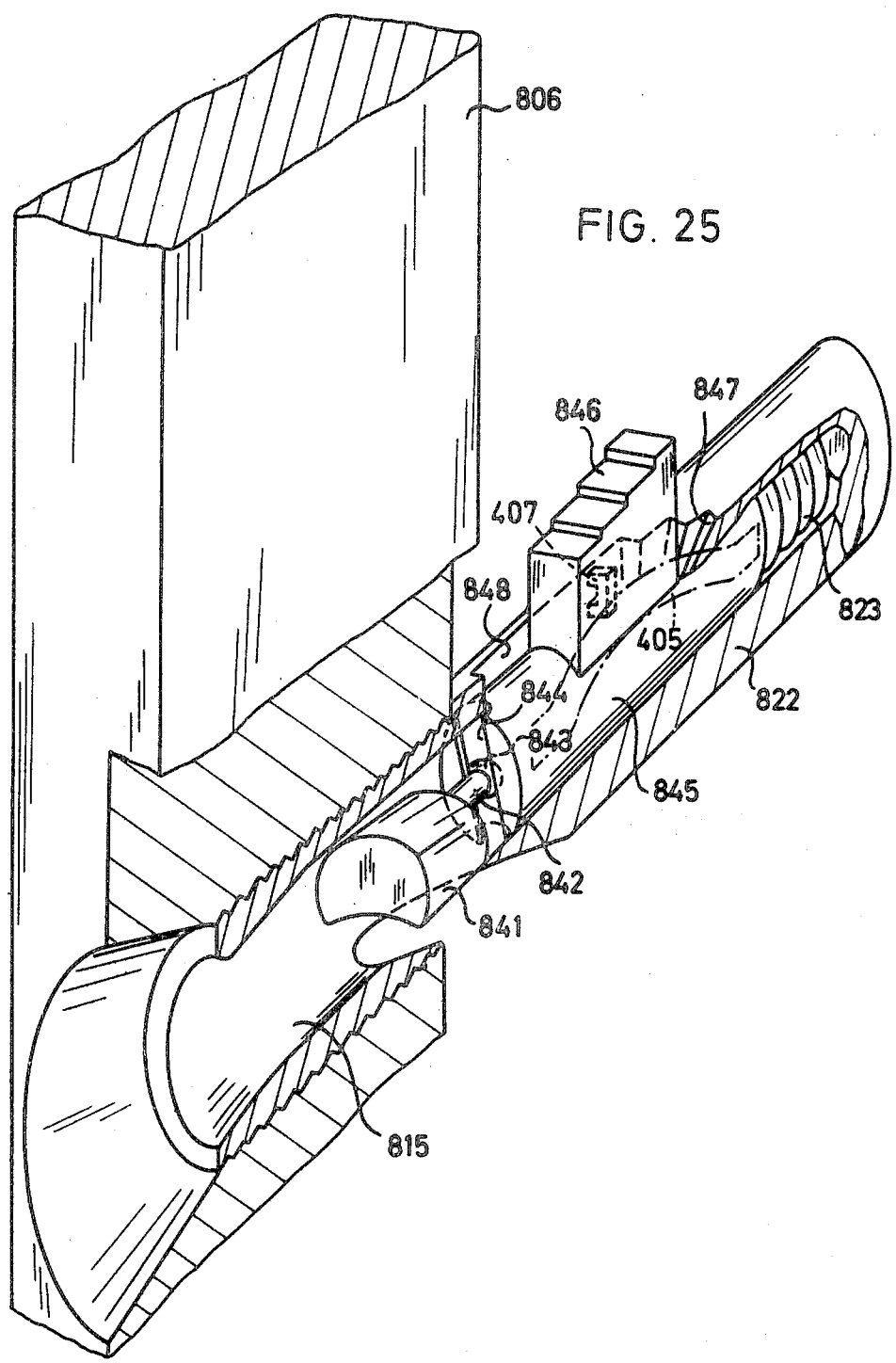
Figure 26:
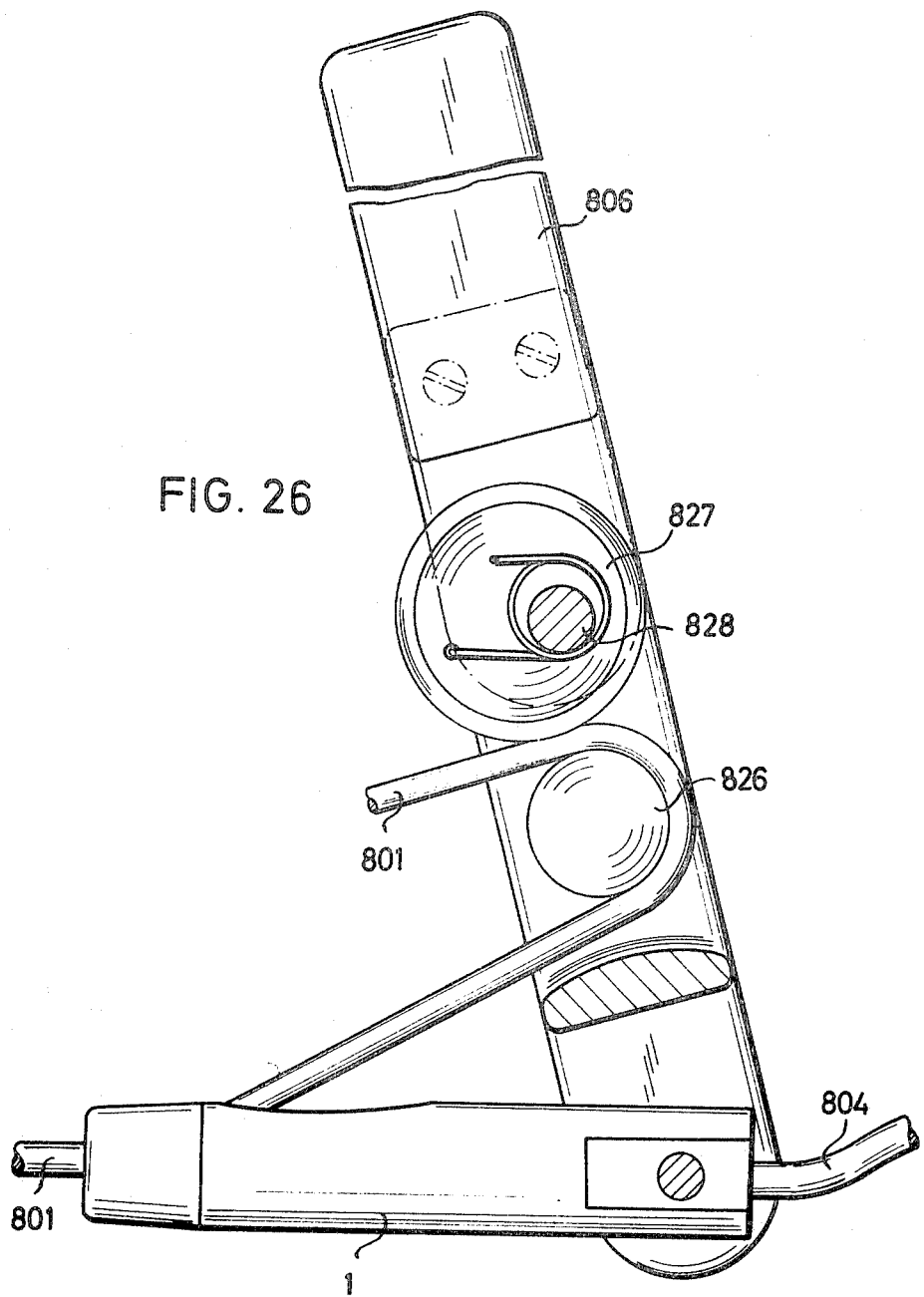
Figure 27:
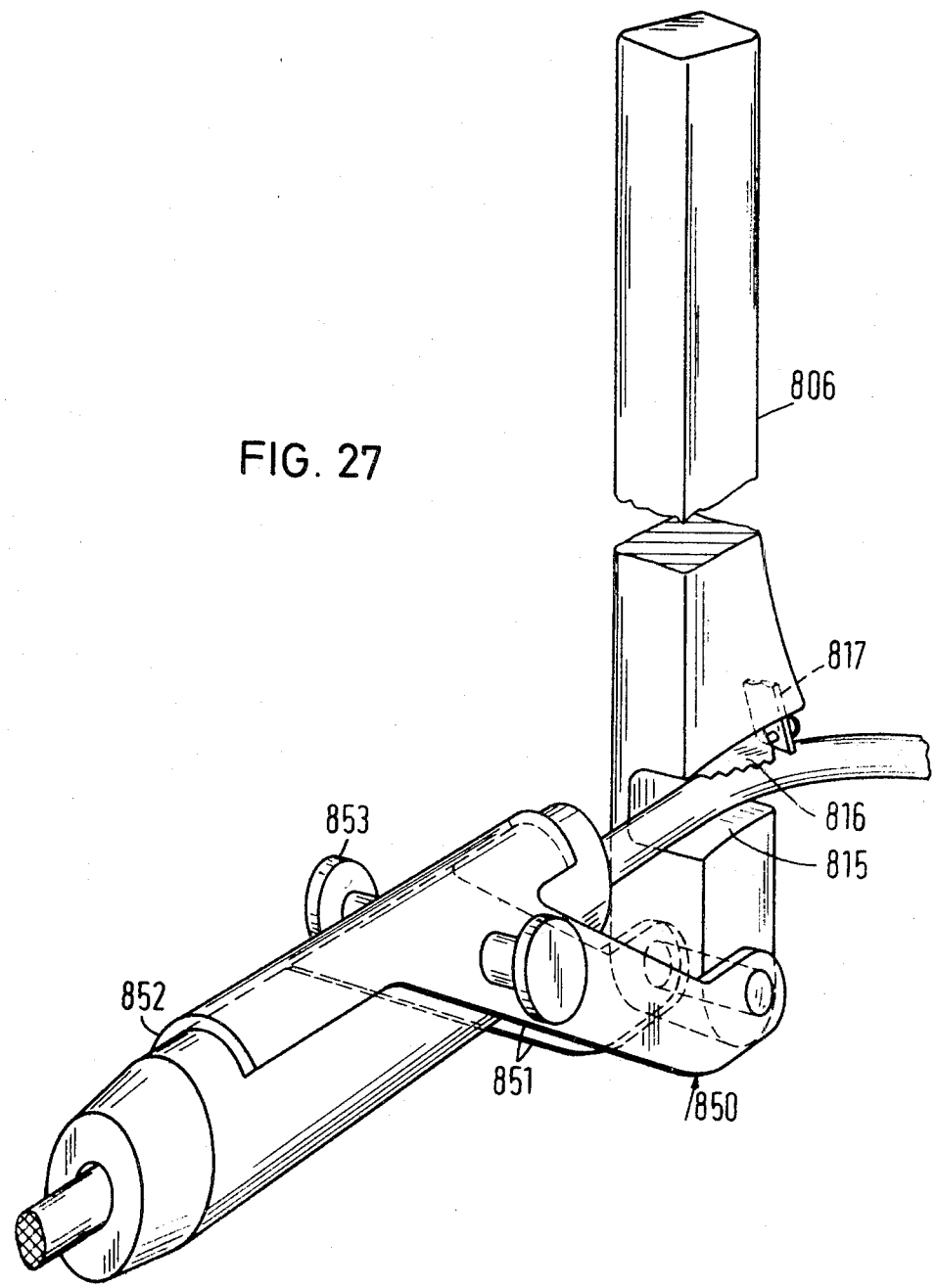
Figure 28:
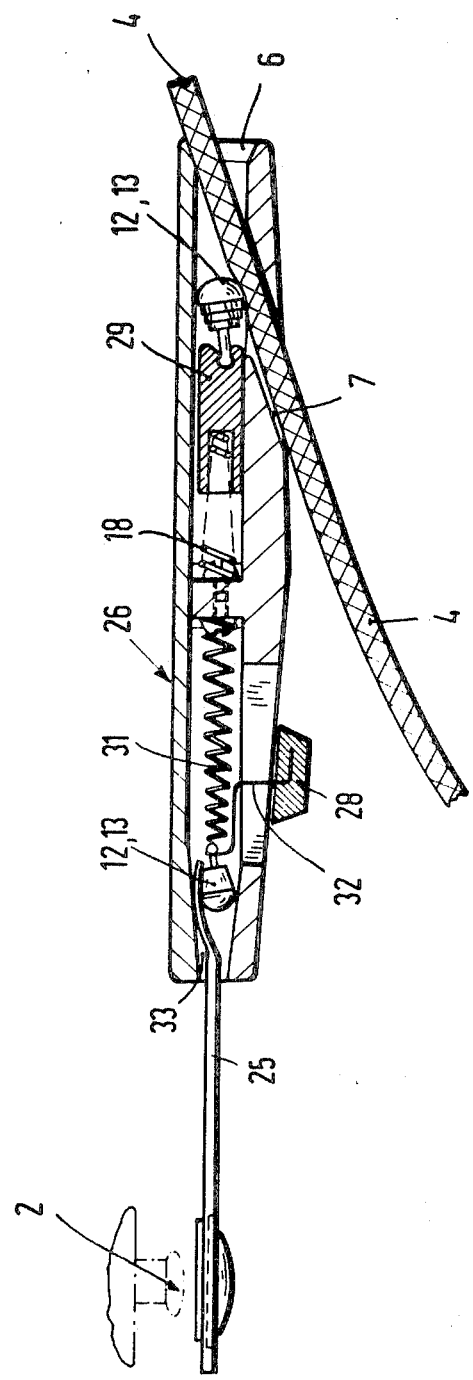
Figure 32:
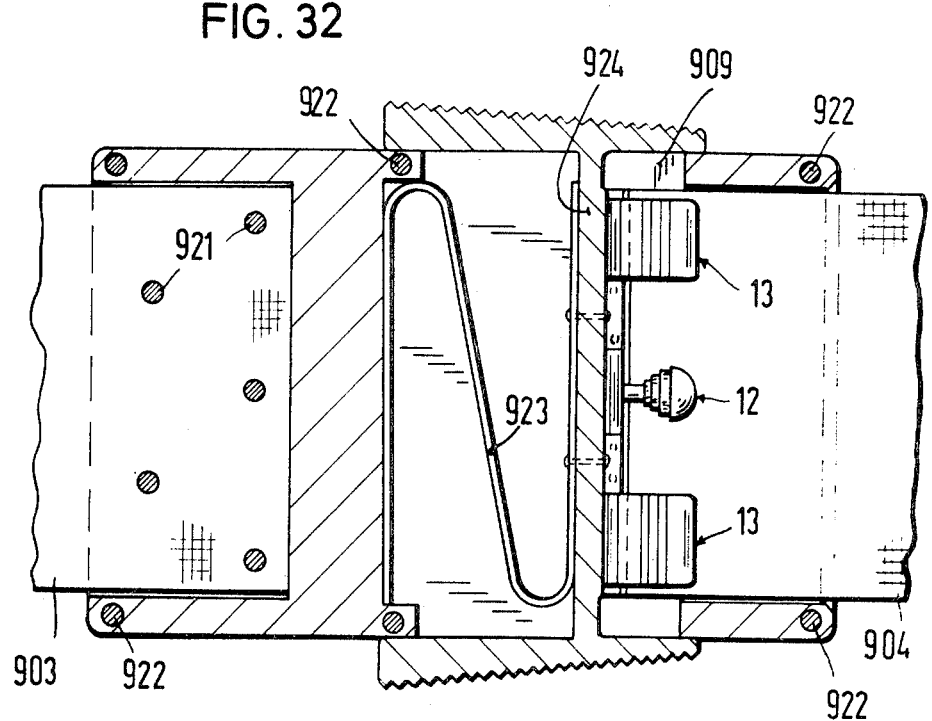
FIG. 32 is a cross section similar to FIG. 31, showing a modification.
Figure 33:
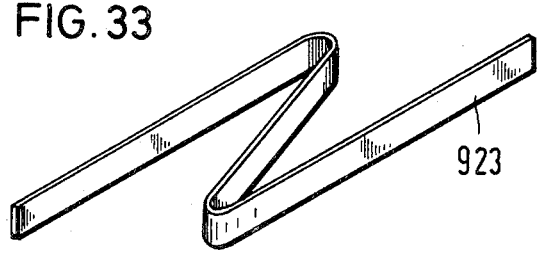
FIG. 33 shows in perspective the spring used in the embodiment of FIG. 32.
Figure 34:
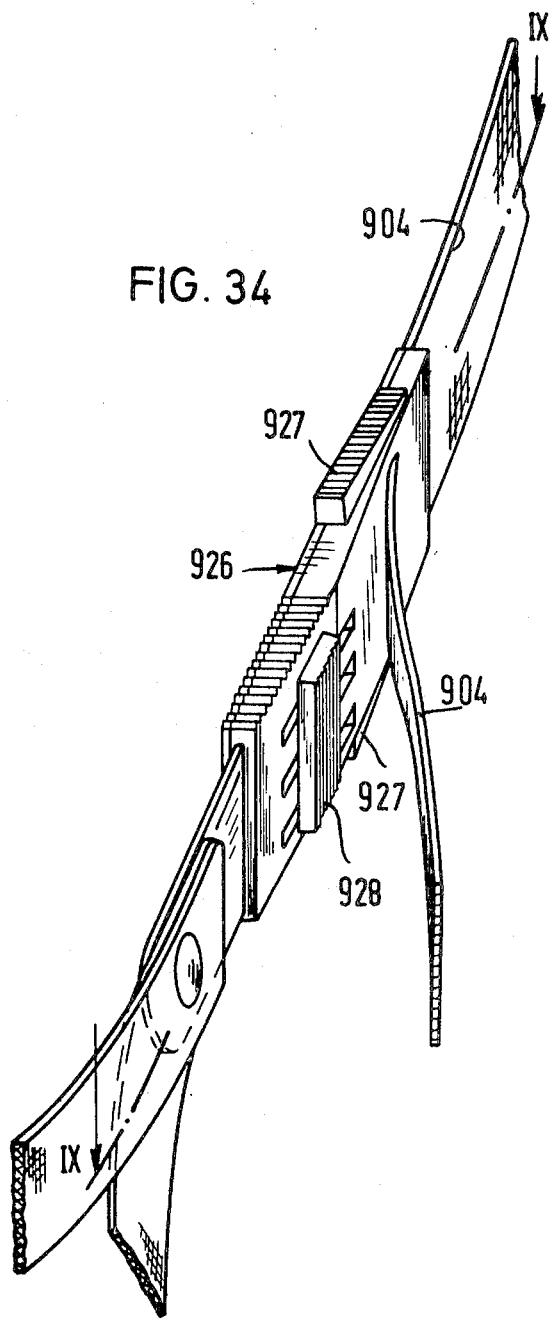
FIG. 34 shows an embodiment with lock and lock plate.
Figure 35:
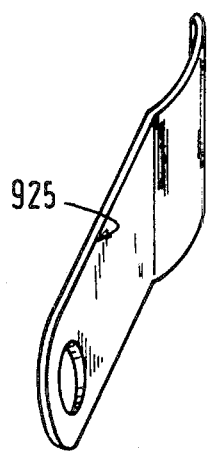
FIG. 35 shows a pan-shaped lock plate used in the FIG. 34 embodiment.
Figure 36A:
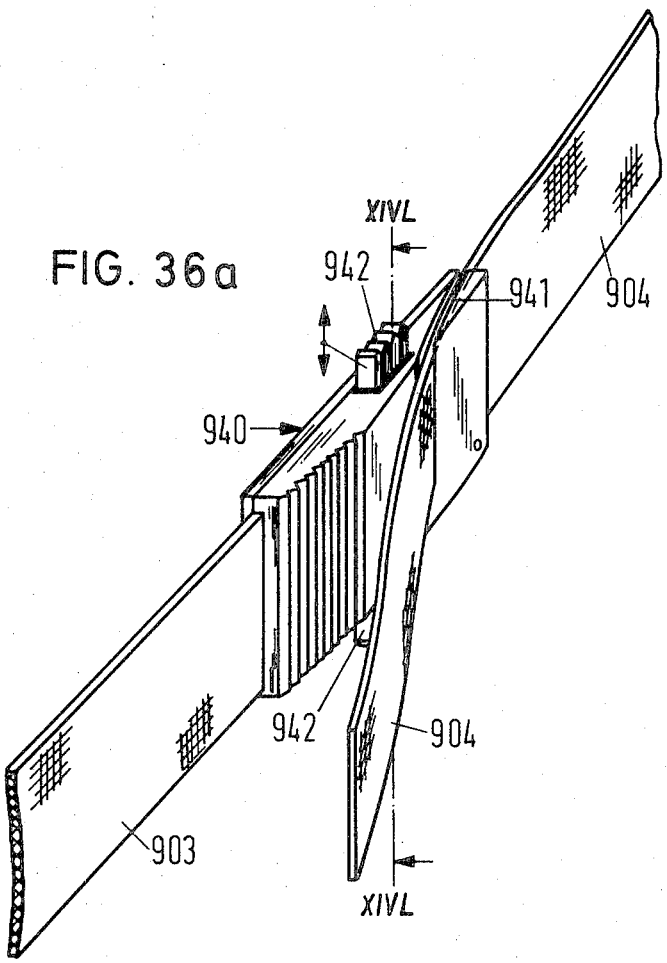
FIG. 36a is a plan view of an embodiment with lateral insertion slot.
Figure 36:
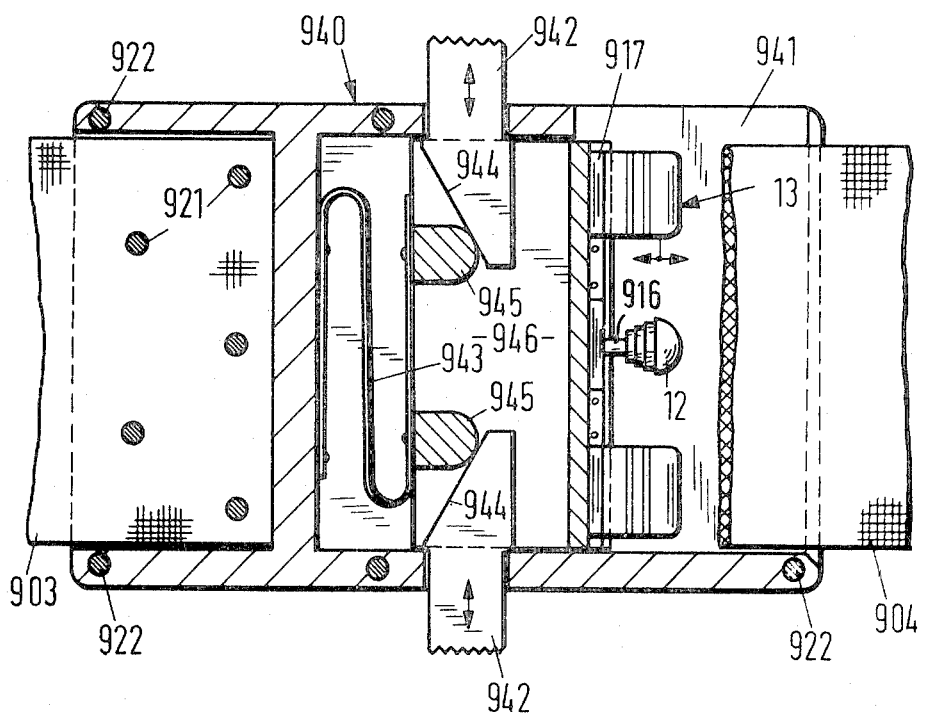
Figure 37:
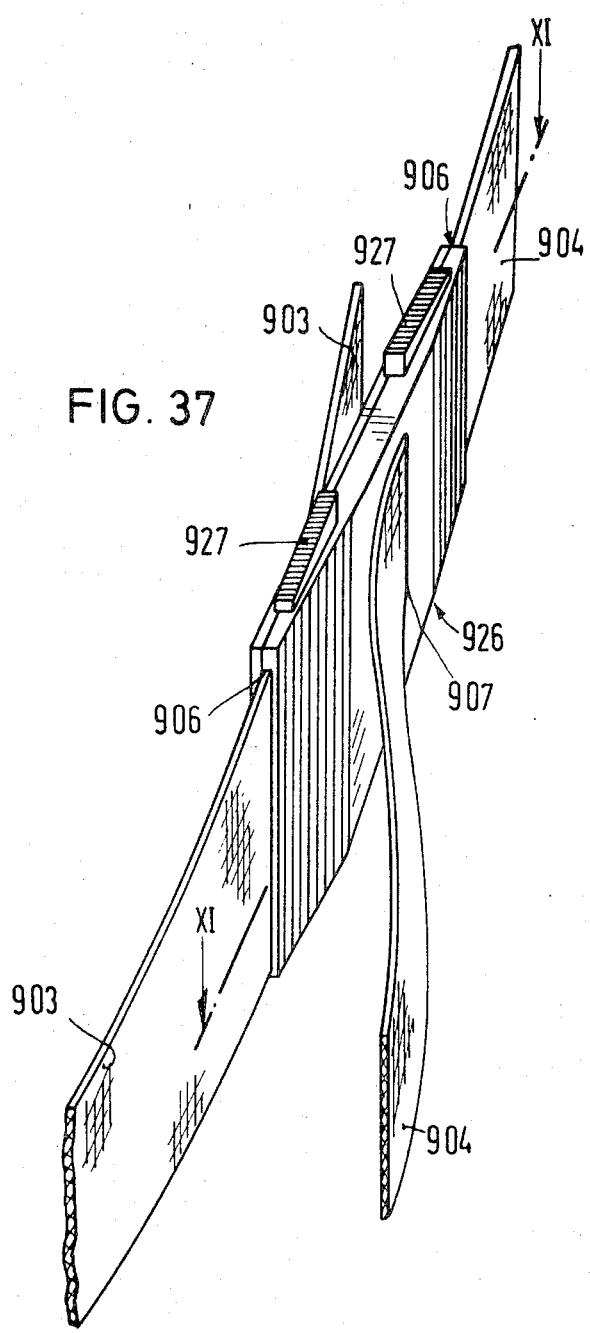
FIG. 37 is a further embodiment of the invention.
Figure 38:
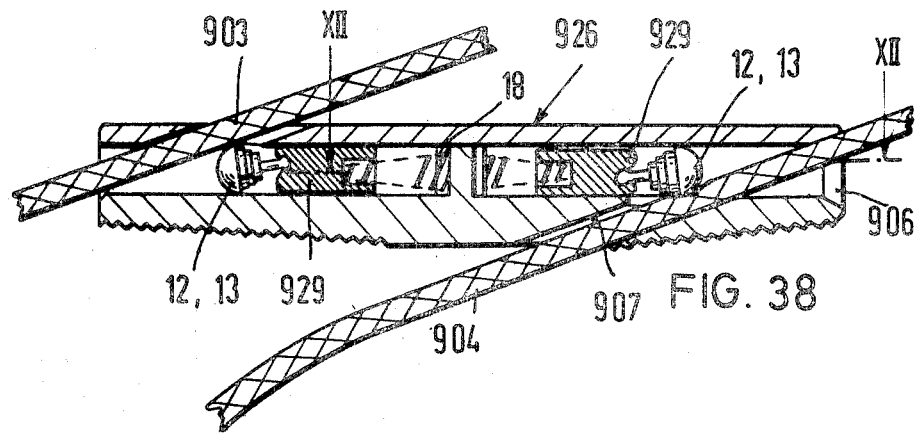
FIG. 38 is a cross section of the embodiment of FIG. 37.
Figure 39:
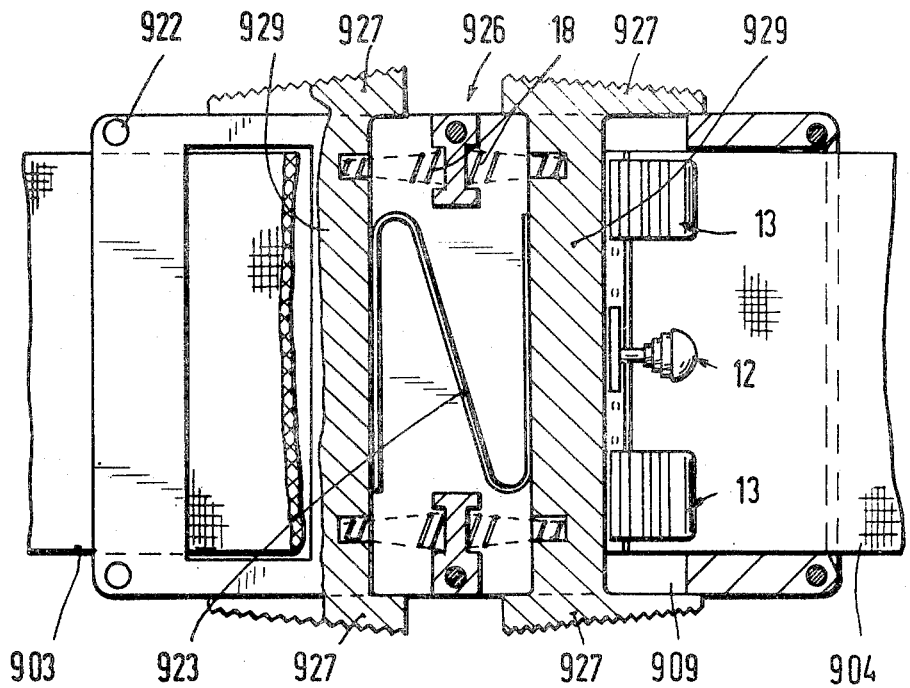
FIG. 39 is a cross section along the line XII—XII in FIG. 38.
Figure 40:
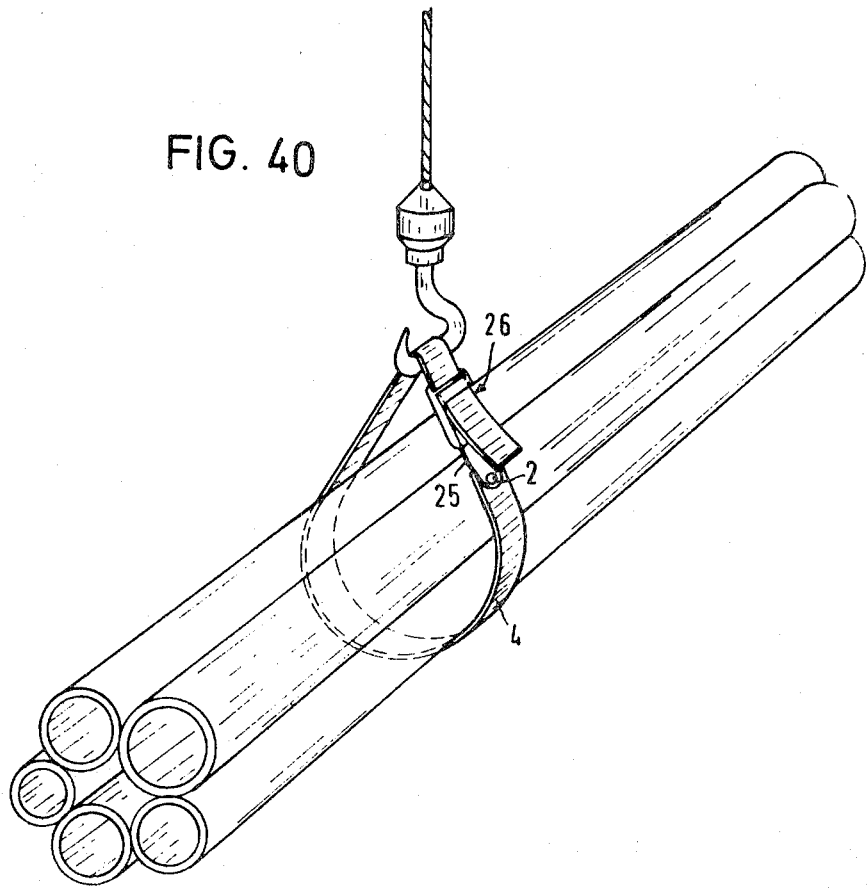
FIG. 40 shows an arrangement in perspective for lifting pipes.
Figure 41:
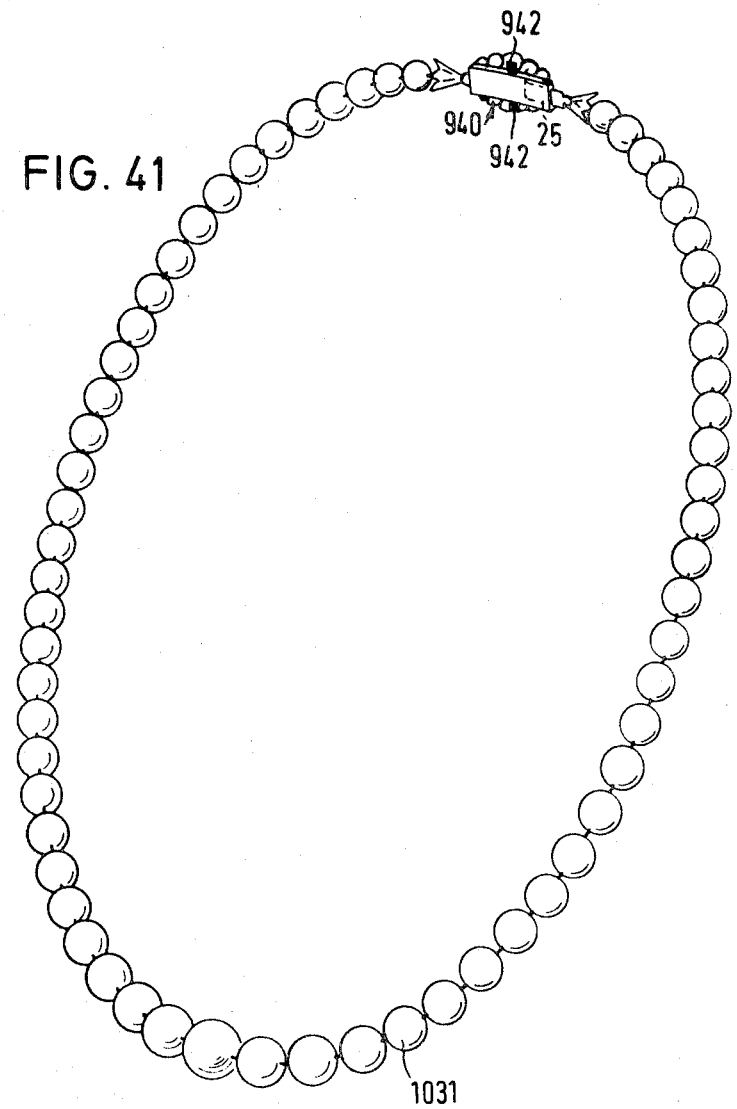
FIG. 41 shows in perspective an ornamental chain with lock.
Figure 42:
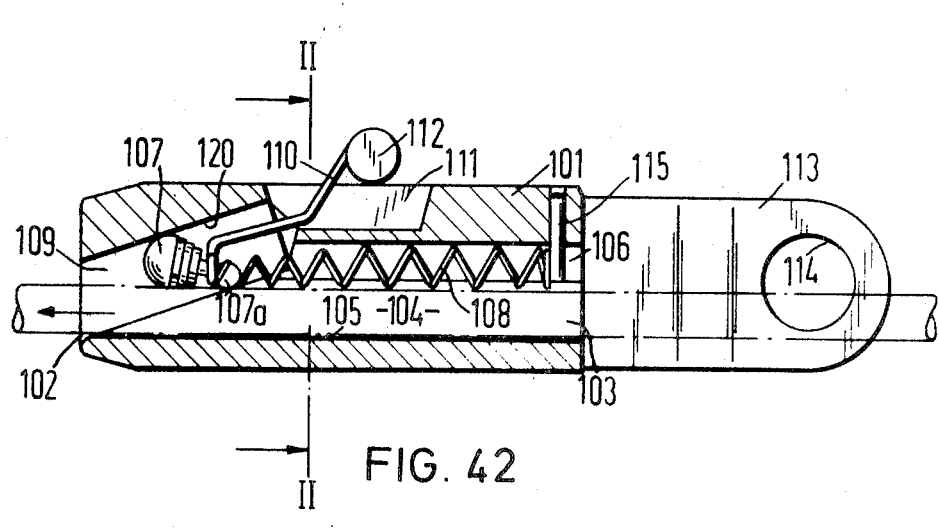
FIG. 42 is an axial cross section of yet another embodiment of the invention.
Figure 43:
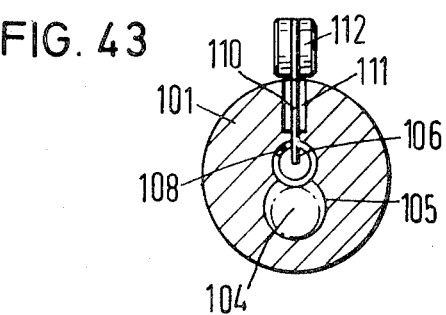
FIG. 43 is a cross section along the line II—II in FIG. 42.
Figure 44:
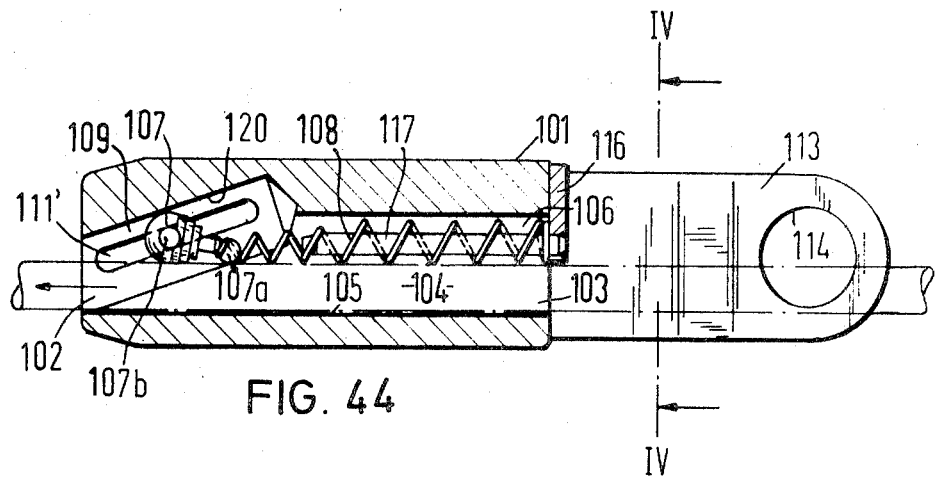
FIG. 44 is a cross section of yet another embodiment of the device according to the invention.
Figure 45:
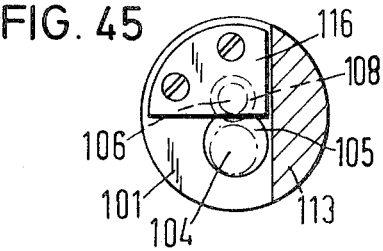
FIG. 45 is a view in the direction of the arrow IV in FIG. 44.
Figure 46:
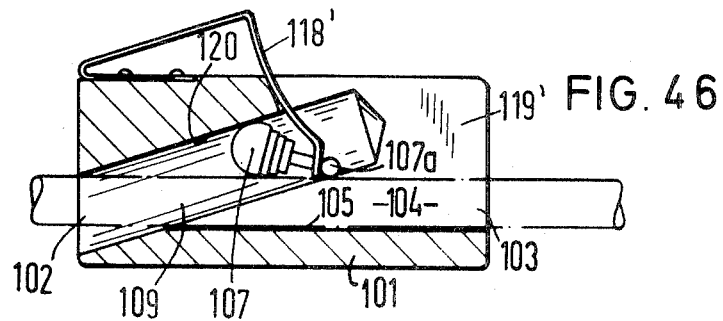
FIG. 46 is a longitudinal cross section of another embodiment of the invention.
Figure 47:
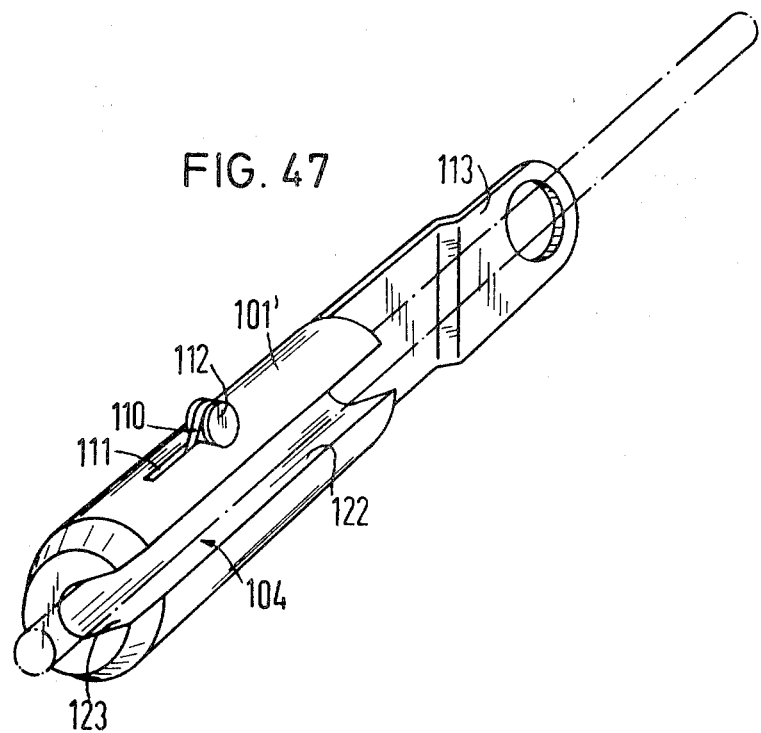
FIG. 47 is a perspective view of yet another embodiment of the invention.
Figure 48:
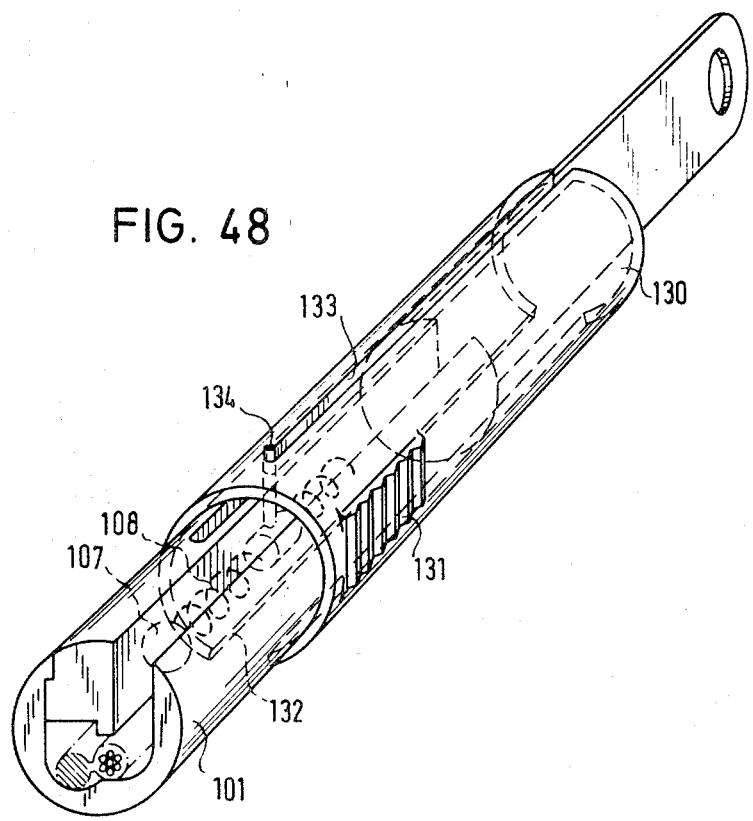
FIG. 48 is a perspective view of a further embodiment of the invention.
Figure 49:
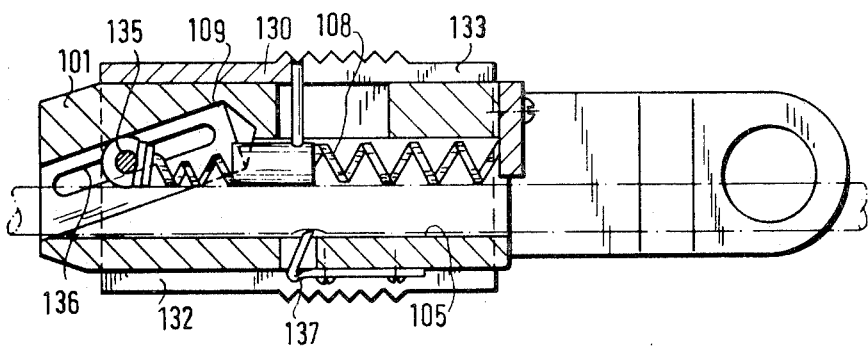
FIG. 49 is an axial cross section of the device in FIG. 48.
Figure 51:
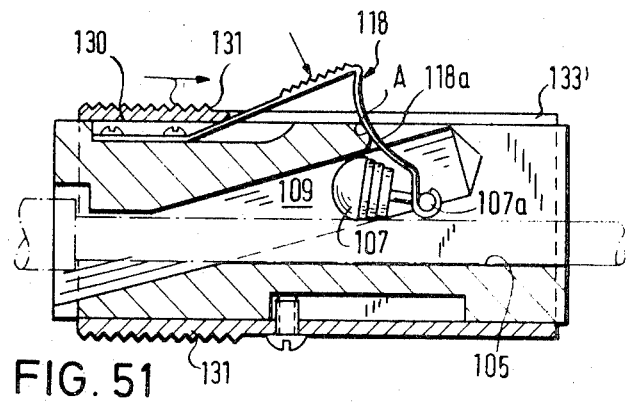
FIG. 51 is an axial cross section of the device in FIG. 50.
Figure 50:
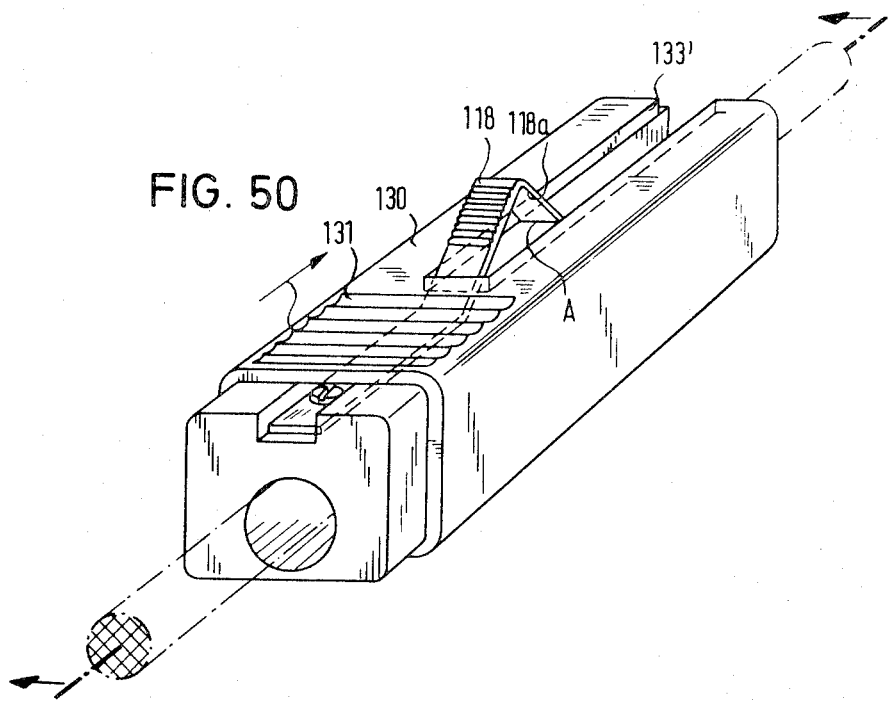
FIG. 50 is a perspective view of a further embodiment of the invention.
Figure 52:
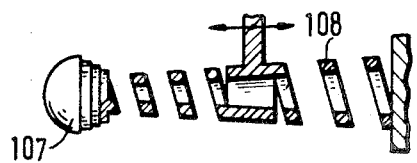
FIG. 52 is a partly opened preferred embodiment of a clamping element made integrally with the compression spring of synthetic resin.

Further features and advantages of the invention will become apparent from the following description of preferred embodiment with reference to the accompanying drawings, and from the appended claims. In the drawings:

FIG. 1 shows securing an electric cable to a mast;
FIG. 2 is a first embodiment of a clamping device;
FIG. 3 is a cross section along the line III—III in FIG. 2;
FIG. 4 is an axial cross section along the line IV—IV in FIG. 3;
FIG. 5 is a cross section similar to that in FIG. 4, but showing a modified clamping device;
FIG. 6 is a cross section along the line VI—VI in FIG. 5;
FIG. 7 is a cross section along the line VII,VII in FIG. 4;
FIG. 8 shows a further embodiment, in which the insertion slot is adapted to be closed by a cover;
FIG. 9 shows the FIG. 8 embodiment in the closed state;
FIG. 10 shows a further embodiment with curved insertion slot;
FIG. 11 shows a further embodiment;
FIG. 12 shows a pushover bush;
FIG. 13 shows an embodiment with fitted pushover and covering bush or sleeve;
FIG. 14 shows a construction similar to FIG. 13 with a modified covering bush;
FIG. 15 shows an embodiment enabling the tensioning and fixing of a cable affected by tension in both directions;
FIG. 16 is a perspective view of a first embodiment with a retensioning device;
FIG. 17 is a side elevation partially in section showing two operating positions, including the retensioning device;
FIG. 18 is a clamping device with a second embodiment of a retensioning device;
FIG. 19 is a side elevation partially in section of the embodiment of FIG. 18;
FIG. 20 is a side elevation partially in section of the embodiment of FIG. 18, cut along another plane;
FIG. 21 shows in partial cross section a clamping device with a third embodiment of a retensioning device;
FIG. 22 shows a modification of FIG. 21;
FIG. 23 shows a further modification of FIG. 21 in perspective;
FIG. 24 shows a roller-shaped clamping element in perspective;
FIG. 25 shows a fourth embodiment of a retensioning device;
FIG. 26 shows a fifth embodiment of a retensioning device, partially in cross section;
FIG. 27 shows a sixth embodiment of a retensioning device;
FIG. 28 is a first embodiment of a safety belt according to the invention in cross section;
FIG. 29 shows a safety belt;
FIG. 30 is a longitudinal cross section of the embodiment of FIG. 29;
FIG. 31 is a further cross section of the embodiment of FIG. 29;

FIG. 32 is a cross section similar to FIG. 31, showing a modification;

FIG. 33 shows in perspective the spring used in the embodiment of FIG. 32;

FIG. 34 shows an embodiment with lock and lock plate;

FIG. 35 shows a pan-shaped lock plate used in the FIG. 34 embodiment;

FIG. 36a is a plan view of an embodiment with lateral insertion slot;

FIG. 36b is a cross section of the embodiment of FIG. 36a;

FIG. 37 is a further embodiment of the invention;

FIG. 38 is a cross section of the embodiment of FIG. 37;

FIG. 39 is a cross section along the line XII—XII in FIG. 38;

FIG. 40 shows an arrangement in perspective for lifting pipes;

FIG. 41 shows in perspective an ornamental chain with lock;

FIG. 42 is an axial cross section of yet another embodiment of the invention;

FIG. 43 is a cross section along the line II—II in FIG. 42;

FIG. 44 is a cross section of yet another embodiment of the device according to the invention;

FIG. 45 is a view in the direction of the arrow IV in FIG. 44;

FIG. 46 is a longitudinal cross section of another embodiment of the invention;

FIG. 47 is a perspective view of yet another embodiment of the invention;

FIG. 48 is a perspective view of a further embodiment of the invention;

FIG. 49 is an axial cross section of the device in FIG. 48;

FIG. 50 is a perspective view of a further embodiment of the invention;

FIG. 51 is an axial cross section of the device in FIG. 50;

FIG. 52 is a partly opened preferred embodiment of a clamping element made integrally with the compression spring of synthetic resin;

FIGS. 53 to 57 are perspective views and cross sections of further preferred embodiments of clamping elements according to the invention;

FIG. 58 is a cross section of a further preferred embodiment;

FIG. 59 is a cross section of the embodiment shown in FIG. 58;

FIG. 60a shows cross sections of sleeves with different configurations;

FIG. 60b shows a movable connection between clamping body and compression spring (leaf spring);

FIG. 60c shows a slotted clamping body.

Figure 62:
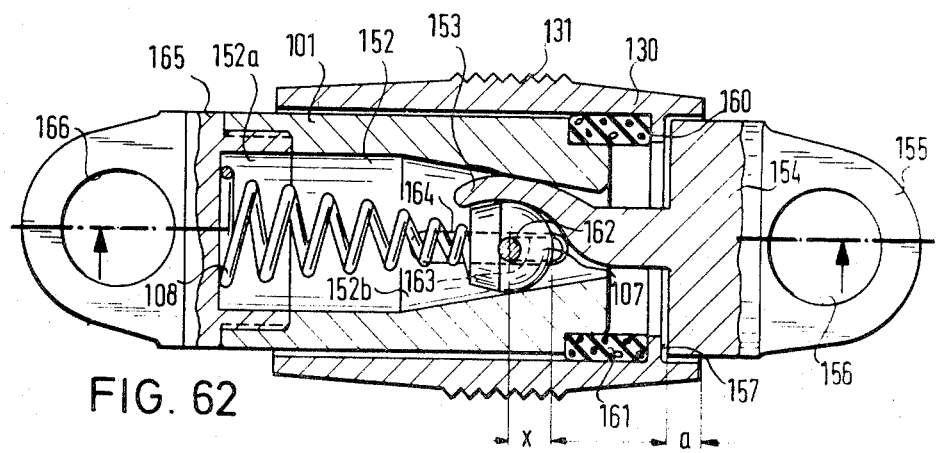
FIG. 62 is a longitudinal cross section of the embodiment in FIG. 61.
Figure 61:
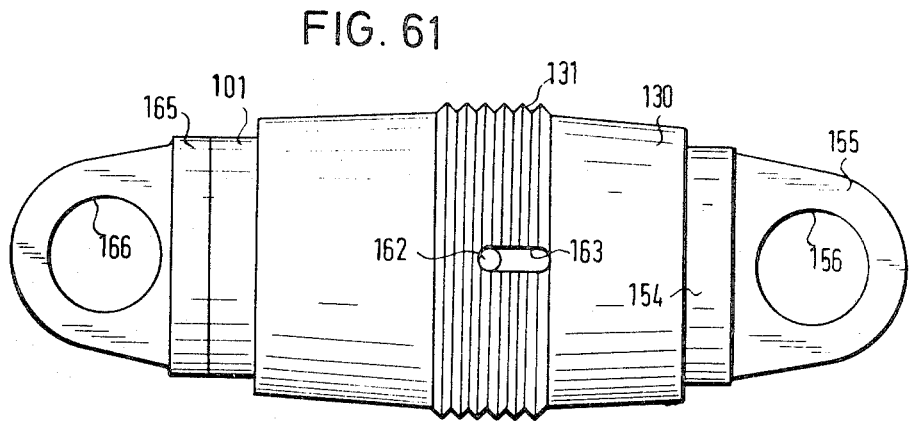
FIG. 61 is a plan view of a further preferred embodiment.
Figure 63:
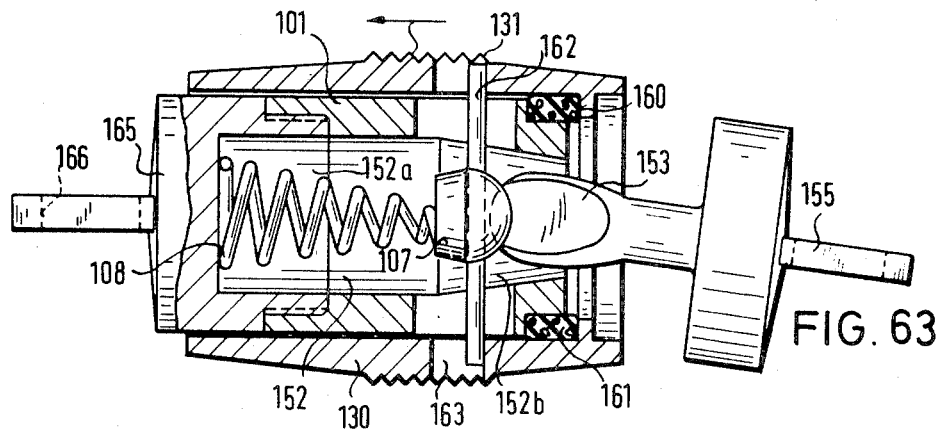
FIG. 63 is an axial cross section of the embodiment of FIG. 61 in the release position.
Figure 64:
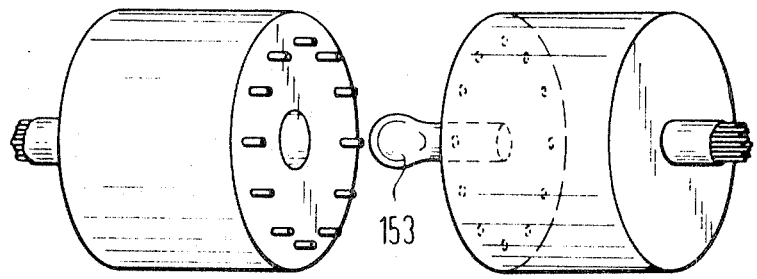
FIG. 64a is an axial cross section of a further preferred embodiment.
FIG. 64b is an axial cross section of yet another preferred embodiment.
Figure 64:
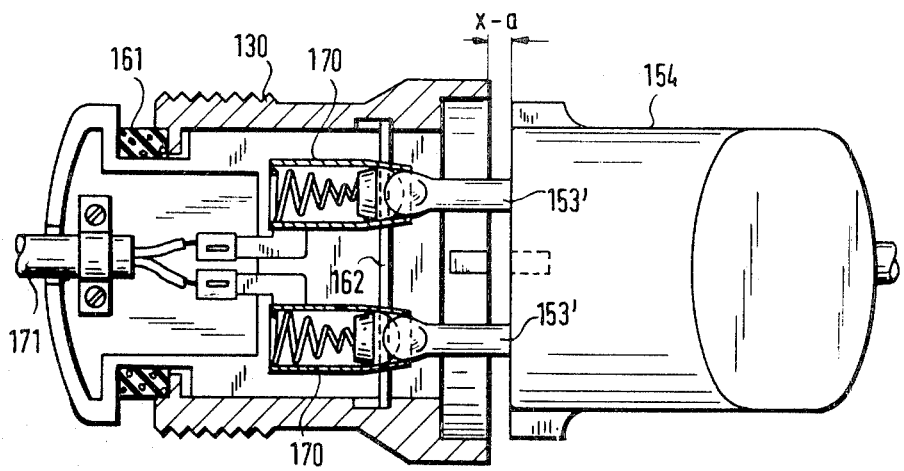
Figure 65:
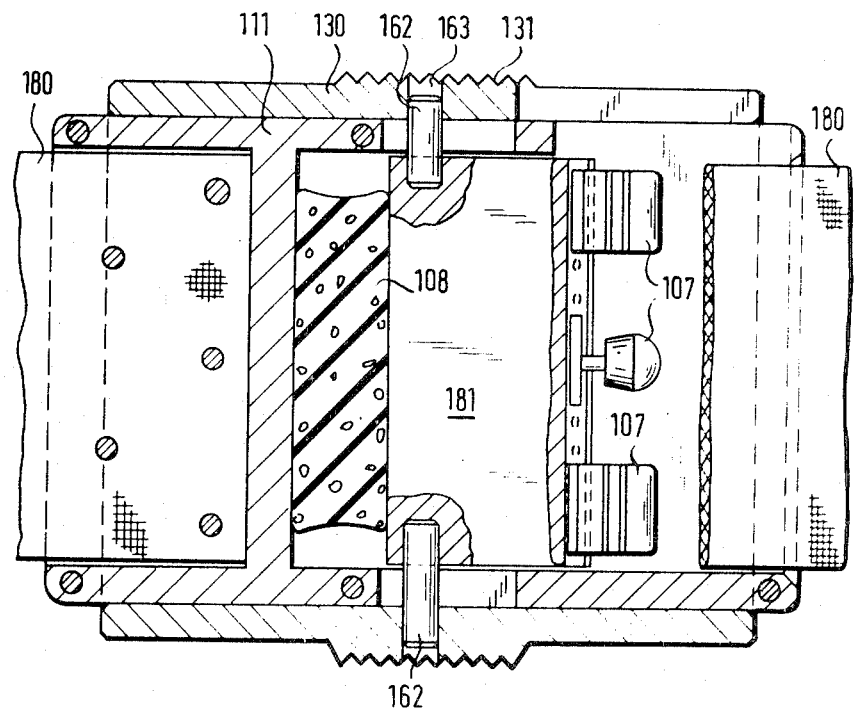
FIG. 65 and 66 are axial cross sections of further preferred embodiments of the invention.
Figure 66:
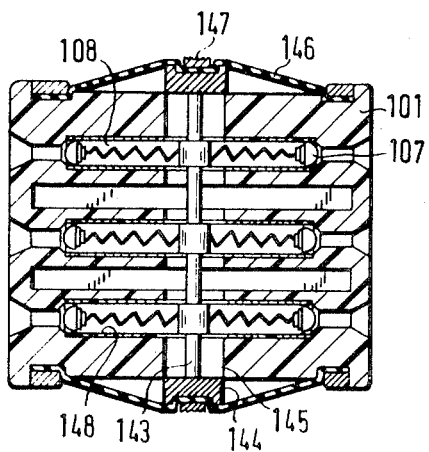
Figure 67:
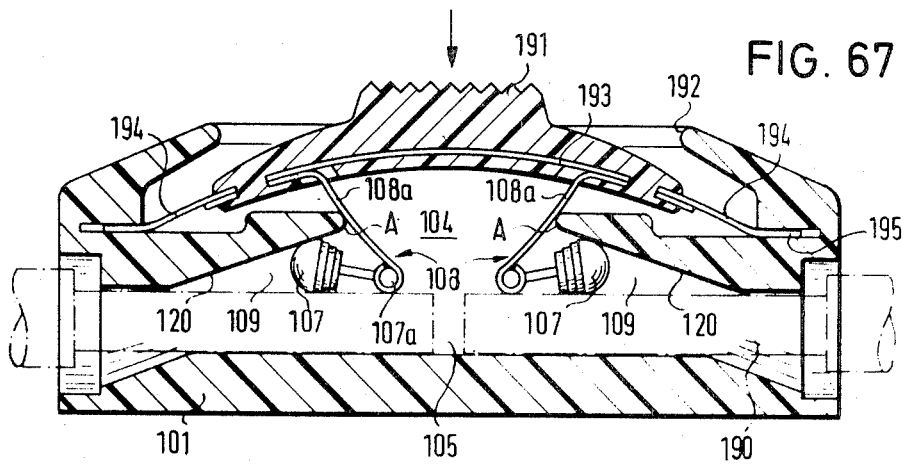
FIG. 67 and 69 are longitudinal cross sections of further preferred embodiments.
Figure 68:
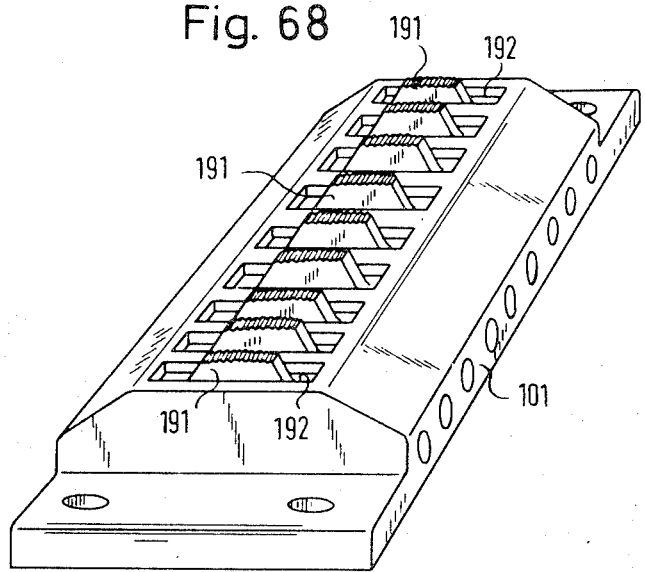
FIG. 68 is a perspective view of a further embodiment, operating after the manner of multiple terminal boxes for a plurality of electrical conductors.
Figure 69:
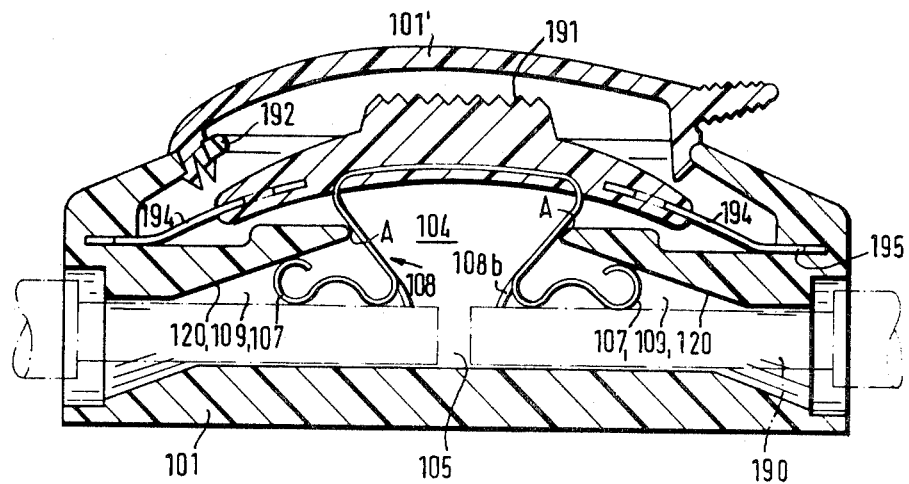

FIG. 61 is a plan view of a further preferred embodiment;

FIG. 62 is a longitudinal cross section of the embodiment in FIG. 61;

FIG. 63 is an axial cross section of the embodiment of FIG. 61 in the release position;

FIG. 64a is an axial cross section of a further preferred embodiment;

FIG. 64b is an axial cross section of yet another preferred embodiment;

FIG. 65 and 66 are axial cross sections of further preferred embodiments of the invention;

FIG. 67 and 69 are longitudinal cross sections of further preferred embodiments; and FIG. 68 is a perspective view of a further embodiment, operating after the manner of multiple terminal boxes for a plurality of electrical conductors.

A long telephone cable 701 can be tensioned with clamping devices 702, equipped with lugs 703, as shown in FIG. 1. The lugs 703 may be hooked into hooks 704 which are screwed into a mast 705. The cable 701 may be a twin cable, one part being equipped with a wire cable and taking up the tensile forces, whilst the other carries the telephone wires.

The clamping devices 702 used for tensioning the cable 701 are so constructed that the cable can be fitted from one side. Thus, it is not necessary for one or the other end of the cable to be accessible. This arrangement substantially facilitates the mounting of cables reeled up on drums. A slide member 708 serves to release the clamping lock.

In the embodiment of FIGS. 2 to 4, the clamping device consists of a profiled member 706 with G-shaped cross section, forming a housing and having on its upper side a slot 707 with an operating slide adapted to slide therein. The body 706 may be made in two parts which are riveted together. Inside the body 706, there is a chamber 710 in which sides a slide member 711 connected with the actuating slide 708; the end face of the slide member is chamfered and has a slot-shaped bearing pan 712 and on its other end a mounting 713 for a helical spring 714. A flat clamping body 8 with a bulging back 715 is connected via a neck portion 12 with a spherical end member 13 which is located in the bearing pan 712; the cross section of the bearing pan 712 is larger than that of the spherical end 13 so that the latter can move with play up and down in the bearing pan.

When the cable 701 is fitted into the profiled opening of the sleeve 706 and the actuating slide 708 is pushed back against the force of the spring 714, the cable 701 slides along a sloping surface under the clamping member 8. The lower surface of the clamping member 8 is concave as at 717 (FIG. 3). When the actuating slide 708 is released, the clamping member rests with its concave lower surface 717 on the surface of the cable 701, tilts under the tension exerted on the cable and locks the same in position. The concave portion 717 prevents the cable from escaping through the open side of the profile.

The tensioned strand of the cable 701 enters therefore through the end opening 6 into the sleeve 706, while the relieved strand of the cable leaves through the oblique bore 7. However, as with all slotted embodiments, the inner bore of the sleeve or bush 706 may be so large as to receive the cable 701 and the spring 714 acting on the clamping member 8 so that the cable can leave towards the rear parallel with the operating direction of the compression spring.

In the modification shown in FIGS. 5 and 6, the clamping member has the shape of a roller 716, mounted rotatably on the slide member 711. The ends of the roller 716 have a larger diameter than its center, adapting it to the diameter of the cable and preventing the same from escaping. Also, as shown in FIG. 6, the roller has a double serration which ensures the reliable locking action in spite of the rotatability of the roller.

FIG. 7 shows more clearly, the vertical mobility of the spherical end 13 in the slide 711. This ensures the tilting action of the clamping member 8 under full utilization of the cross section 710 of the inner bore of the sleeve.

In the embodiment shown in FIGS. 8 and 9, the clamping device consists of a housing part 719 with substantially U-shaped cross section. One leg of this part 719 is longitudinally slotted and is adapted to receive a substantially L-shaped sliding cover 721. A leaf spring 722 rests with its end in a groove 723, in the open position shown in FIG. 8. In the closed position, it rests on the outside of the U-shaped part 719. When the cable 701 is to be fitted or removed, a tool is inserted into a slot 724, and the cover can be moved into the open position (FIG. 8) by turning the tool.

FIG. 10 shows a modification of the embodiment of FIG. 3. The slotted opening for fitting the cable is curved to prevent reliably an accidental escape of the cable 701.

FIG. 11 shows a further modification in which the same object is realized by the labyrinth shaped configuration of the slot.

A sleeve 725, such as shown in FIG. 12, may serve for closing the slot used for fitting the cable 701 and for improving the mechanical strength.

FIG. 13 shows an embodiment using a round bush 726 and a corresponding cylindrical sleeve 725. During the fitting the sleeve 725 is rotated, ensuring the reliable closure of the opening.

In the embodiment of FIG. 14 the escape of the cable 701 is prevented by a sleeve ring 727 which also serves to prevent loss of the clamping member 8. The sleeve ring 727 is guided Instead of the said rivets 922 or additionally thereto, the parts of the lock may also be connected by welding, especially in the case of synthetic resins. Particularly suitable for this purpose is ultrasonic welding.

The belt itself, e.g., for an automobile, consists preferably of three parts, of which two are mounted on the left and right under the seat and the third on the left above the rear seat. As shown in FIG. 28, the left-hand parts are both mounted on the lock plate, while the right-hand portion carries the lock. Accordingly, this invention, both belt sections can be released in one motion by operating the slide, while permitting at any time the retensioning of the device by shifting the lock, or an extension by operating the grip levers. During the retensioning, the safety is fully maintained, and this is an essential feature of the invention, because in the known construction of safety belts, a slight movement of the lock on the belt is not possible against the locking action.

Known safety belts have a lock in which a knurled roller extending over the whole width of the belt is pressed by a spring against the surface of the belt. This may cause the belt to be cut in the case of an accident, as has been shown in many cases. According to the invention, the clamping members are arranged in spaced-apart relationship so that the intermediate belt portions cannot be thereby damaged and cutting of the belt transversely of its longitudinal extent is prevented. However, tear sections in the longitudinal extent of the belt are desirable, because these maintain a uniform resistance up to the termination of the stress.

FIG. 40 shows, by way of example, that the combination of lock and lock plate is particularly suitable for closed, ring-shaped belts such as are used for collecting and transporting loads, newspapers, files, and the like. Where pipelines are to be laid and held in certain positions, these belts also offer great advantages. The loop may be easily, possibly with only one hand, be enlarged or shortened, and the lock plate released, while on the other hand, the construction ensures that there can be no slipping under load. The drawing shows a lock, drawn on a larger scale in FIG. 28. If desired, the actuators for releasing the belt 4 or the lock plate 25 may also be arranged on the side of the lock 26.

FIG. 41 shows this combination is also suitable for ornamental chains and bracelets, with the particular advantage of reliably preventing accidental opening of the lock and loss of the ornament. Particularly, a lock 940, such as shown on an enlarged scale in FIG. 36b, is suitable for this purpose, using, of course, a lock plate 25 instead of the belt 904. The actuating members 942 on both sides of the lock act on the sliding member 946 so that only common actuation results in the release. If required, the sliding member may also be divided into two parts, ensuring, for example, that a pearl necklace 1031 is not accidentally lost.

The embodiment of FIG. 42 and 43 shows a housing 101 with a recess 104. The said recess 104 has an insertion orifice 102 at one end and an outlet orifice 103 at the other end for an electric cable or the like. The recess 104 has a continuous cylindrical bore 105 for passing therethrough a cable (dash-dot lines) and a laterally offset cavity 109 for a clamping element 107, corresponding to those described hereinbefore and communicating with a bore 106 parallel to the cavity 105 and containing a compression spring 108 acting on the clamping element 107. A wire member 110 is provided for releasing the clamping effect of the clamping element 107; this wire member passes outward through a slot 111 parallel to the longitudinal axis of the device and has at its outer end a grip roller 112. The cavity 109 receiving the clamping element is a blind, cylindrical bore.

The wall of the cavity 109, extending obliquely to the inlet orifice 102 serves as wedge-shaped clamping and guide surface for the clamping element 107. The required clamping force is transmitted by the wedge effect through the clamping member 107 to a rope or cable inserted through the inlet orifice 102, causing the same to be clamped tightly between the clamping element 107 and the wall of the bore 105. In the embodiment shown, the axes of the bores 105, 106 and 107 are in one plane. However, the bore 109 may be oblique so that the clamping element 107 can deflect laterally towards the bottom, enabling the structural length of the device to be reduced.

At its rear end, the housing 101 carries an extension 113, fixed by screws, and having an eyelet for mounting on a wall, mast or the like. A pin 115 passing through the housing and projecting into the bore 106 serves as abutment for the compression spring 108, which is guided in a bore 106 and secured against loss in the bore 105.

In order to achieve the tilting of the clamping element 107 into the clamping position and to improve the contact and the clamping effect, the clamping element 107 is connected articulately with the spring 108, by means of a shank with aspherical end 107a which is lodged in the last turn of the helical spring 108.

In the following further examples and insofar as these follow generally the device described with reference to FIGS. 42 and 43, the same reference numerals are used, and identical parts will not be again described.

In the embodiment of FIGS. 44 and 45, the wire member 110 with the grip roller 112 in FIGS. 42 and 43 is replaced by a bore 107b in the clamping element 107 and cooperating with a slot 111'. A tool can be inserted through the slot 111' and the bore 107b to release the clamping element 107. The reliably ensures the prevention of accidental release which is not possible with reliability in the embodiment of FIGS. 42 and 43 owing to easy contact of the grip roller 112.

The embodiment of FIGS. 44 and 45 also comprises a separate guide pin 117 for the compression spring 108 mounted on a support 116 fixed to the housing 101.

The embodiment of FIG. 46 comprises a clamping element 107 held by a leaf spring 118' and guided in a slot 119'. The slot 119' starts from the rear end of the oblong housing 101 which has a cylindrical configuration. However, the leaf spring 118' is substantially L-shaped and fixed with one angled end of one leg to the housing 101, while the clamping element 107 is pivotably mounted on the end of the other leg. The leg of the leaf spring 118' holding the clamping element 107 slides along the front end wall of the slot 119' under the action of a force on the corner of the leaf spring, moving the element into the release position.

FIG. 47 shows an embodiment which permits the fitting from the side of endless cables, ropes and the like. To this end, a cylindrical housing 101', containing in its recess 104 a compression spring and a clamping element, as shown in FIG. 42 has a lateral slot, through which the cable can be inserted. This slot continues in a wedge-shaped, oblique surface 123 leading into the recess 104. When an uncut cable is fitted into the slot 122, it slides along the surface 123 into the cavity 104 and is lodged under the clamping element, which has been withdrawn by means of the actuating handle 112. To prevent the cable from sliding out, the slot 122 may either be closed by a slide member or may be curved, have a zigzag configuration or the like.

FIGS. 48 and 49 show a further construction adapted to receive an endless, uncut cable. However, here the release is effected not by a wire 110 with grip roller 112m as in FIG. 47, but by a bush 130 which surrounds the cylindrical housing 101 and is longitudinally displaceable thereon. The sleeve 130 is knurled as at 131 and has two slots 132 and 133. The slot 132 extends in the longitudinal direction from one end of the bush to the other, permitting the unobstructed fitting of the cable. Obviously the width of the slot 132 must be such as to accommodate the cable.

The bayonet-shaped slot 133 cooperates with a pin 134 which is associated with a spring 108 for releasing the locking action. By shifting the bush 130 with the slot 133, which extends to one end face of the bush, the clamping element 107 can be moved into the release position.

The bush 130 offers the facilitates of a particularly convenient operation and closes the clamping mechanism completely towards the outside, thus preventing dirt and water, i.e., also the formation of ice during the winter season.

As shown in FIG. 49, the clamping element 107 carries a pin 135 which slides in a slot 136 of the housing 101, ensuring the perfect guiding action of the clamping element 107 in the laterally offset cavity 109. A hook 137 provides additional safety of the clamping mechanism.

FIG. 49 also shows that the bore 109 for the clamping element 107 is larger than the bore 105, providing an improved guiding action of the clamping element 107 in the bore 109.

The embodiment depicted in FIGS. 50 and 51 is similar to that of FIG. 46, but with the difference of providing a bush 150, similar to that of FIGS. 48 and 49, for releasing the clamping mechanism. The bush 130 is longitudinally displaceably mounted on the housing 101 and has a longitudinal slot 133' for receiving a leaf spring 118'. When the bush is moved to the right, as viewed in the drawing, the clamping element 107 is pivoted and moved into the release position, whilst an arcuate part 118a of the leaf spring 118' rests on an abutment A of the housing 101. The end of the spring 118' embraces the shank of the clamping element 107 by means of the thicker end, forming a loop thereabout.

FIG. 52 shows a particularly preferred embodiment of the clamping element and compression spring, made in one piece and consisting of a plastic, for example, of polyvinyl chloride. Obviously, this integral construction is very inexpensive and economical, and can be used in all preceding embodiments in which a helical spring is provided.

FIGS. 53 through 57 show preferred embodiments of the clamping element 107.

Figure 53:
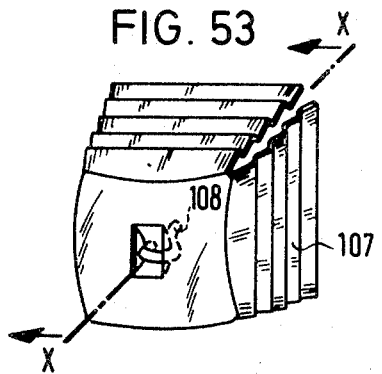
FIGS. 53 to 57 are perspective views and cross sections of further preferred embodiments of clamping elements according to the invention.
Figure 55:
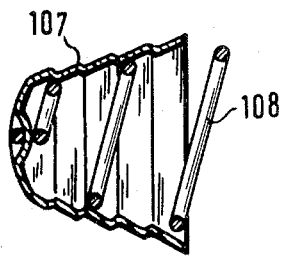

All these clamping elements are hollow and drop-shaped. The element of FIG. 53 is a stamped component, formed by subsequent bending. FIG. 55 shows a cross section of this clamping element 107 along the line X—X in FIG. 53.

Figure 54:
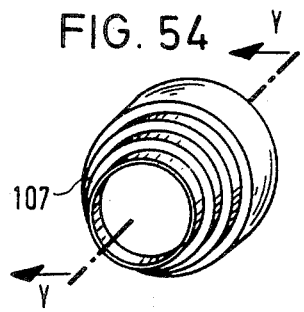
Figure 56:
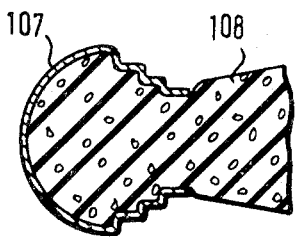

FIGS. 54 and 56 show a hollow clamping element 107, produced by pressing, namely in perspective in FIG. 54 and in cross section along the line Y—Y in FIG. 56. The tapering open end of the clamping element has the advantage that the compression spring 108 is connected with the clamping element 108 in a very simple manner. The helical spring 108 shown may also be replaced by any other elastic material, e.g., by sponge rubber, with solid cross section, tapering conically towards the clamping element. If the hollow clamping element is used together with a spring of solid elastic material, e.g., a sponge rubber spring, the clamping element has preferably a bore, containing a pin, permitting the clamping element to pivot, and serving also as actuating element and/or guide. It also improves the strength and stiffness of the clamping element. The conical taper of the elastic material towards the clamping element permits the easy tilting thereof.

Figure 57:
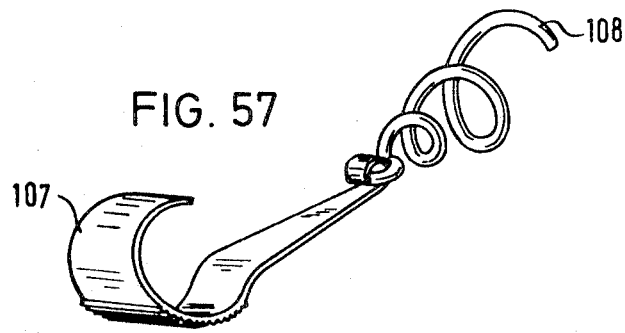

FIG. 57 shows a particularly inexpensive and simple construction of a preferably metal clamping element 107, produced by bending and/or pressing. This embodiment is used preferably in the clamping device according to FIG. 51; a further simplification may be achieved in that the clamping element 107 and the leaf spring 118' are made in one piece. Preferably, the surface of the clamping element producing the clamping action is serrated to increase the friction. The leaf spring is to make contact with the connecting element at two points, namely where it forms the clamping element and where the rounded portion clamps the connecting element and tightens it against tension. Accordingly, the leaf spring is curved, as shown in FIG. 57.

Obviously, the embodiment described in FIGS. 52 through 57 can be used at choice in all described clamping mechanisms. Furthermore, in all these devices, the helical spring can always be replaced by a solid material spring, and the particular advantages and features of the various devices may be combined so as to give further advantageous embodiments and constructions.

FIG. 58 shows yet another preferred embodiment of the device in which the release is again performed by means of a bush 130. As can be seen from FIG. 58, there are two opposite clamping elements 107 which are interconnected by the compression spring 108. This compression spring 108 consists of an elastic material, such as, e.g., sponge rubber and has a solid cross section, formed as a double cone, tapering in the direction of the two clamping elements and permitting them to tilt. This arrangement is used preferably for electric cables and includes to this end a metal strip 140. Only the cable introduced from the right side is shown and it must be understood that such cables are introduced from both sides. When the cables have been fixed by the clamping elements 107, the metal strip 140 forms a conducting connection therebetween.

For releasing the clamping action, each hollow clamping element 107 has an actuating pin 141; this pin 141 passes though the hollow clamping element so that the same can pivot about the pin into the clamping position. At least one end of the pin 141 passes out of the clamping element 107 and engages into a recess 142 in the bush 130, one such recess being provided for each pin. Thus, according to the direction of movement of the bush 130 on the housing 101, either one or the other clamping element can be released.

According to FIG. 59, several clamping devices are combined to form a unit; these devices are arranged side by side, resulting in an arrangement similar to a series terminal.

Figure 60:
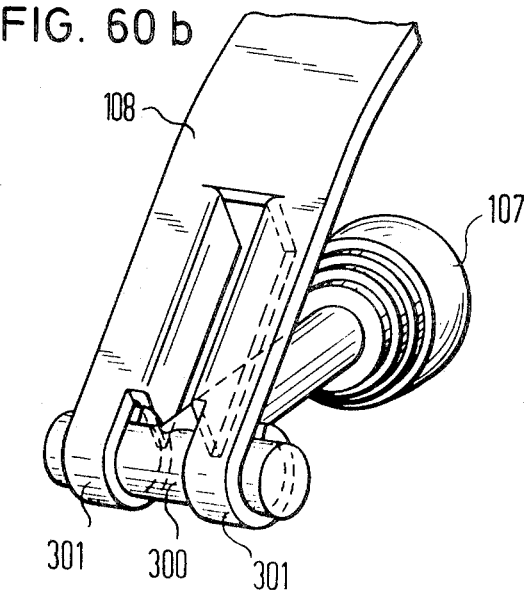
FIG. 60a shows cross sections of sleeves with different configurations.
FIG. 60b shows a movable connection between clamping body and compression spring (leaf spring)
FIG. 60c shows a slotted clamping body.
Figure 60:
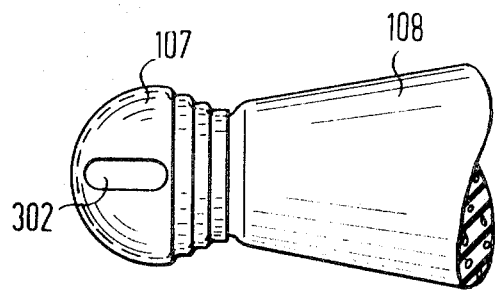

FIG. 60 shows various cross sections of the bush 130.

In the arrangement of FIG. 59, care must be taken that the turns of the compression spring for the clamping element, located in the drawing to the left of the actuating member connected to the actuating pin, are such that a sufficient returning force is exerted on the clamping element when the same is withdrawn from the clamping position. Hence, preferably only one or two turns are used. Instead of these turns, it is also possible to use an oblong, straight, connecting member which does not extend in the withdrawing direction and entrains the clamping element immediately on actuation of the bush 130. However, in this case the clamping element must have a sufficient mobility to permit its pivoting and tilting movement.

The plastic compression springs for the clamping element have also the further advantage of acting as insulators and preventing the flow of currents in the case of electric cables.

Where leaf springs are used as compression springs, care must be taken of connecting the clamping element with the leaf spring so that it can pivot and tilt, while being well retained and guided by the spring. After the connecting element has been fitted, the same should not be withdrawable by more than about one-twentieth to one-tenth on an inch. This requirement is met, according to FIG. 60b, in that the shank of the clamping element 107 is provided with a cylindrical pin 300, extending vertically across the shank, and engaging into a forked end of the leaf spring, and mounted pivotably and tiltably in the two bentover legs 301 of the forked end. In this manner, the clamping element 107 and its shank cannot move relative to the leaf spring 108, e.g., during the insertion of the connecting element. This requirement is also met with spherically widened ends 107a of the shank, by suitably retaining and mounting the same.

In a particularly preferred embodiment, the end of the leaf spring is provided with a locking hook, described further below with reference to FIG. 69; this hook has, on one hand, the advantage of providing additional safety, and on the other hand, the advantage of double contact, which may be necessary for more than 16 amperes. Where the connecting element is exposed to a tensile stress, the clamping element, being pushed more strongly into the wedge-shaped clamping surfaces, causes the leaf spring with the locking hook to be pressed more strongly against the connecting element so that the clamping effect increases with the tensile stress applied thereto.

In order to facilitate more particularly the connection shown in FIG. 58, the bore in the clamping element 107 may be replaced by a slot (FIG. 60c) extending substantially in the longitudinal direction of the compression spring 108. If in this case, the connection is released by moving the bush 130, the actuating pin 141 pivots the clamping element 107 at the start of the release action first out of its pivoted position, prior to the actual withdrawing action. This largely cancels the wedge effect and substantially facilitates the release. Preferably, the slot is inclined to the longitudinal axis of the clamping element, i.e., it extends obliquely. The inclination of the slot to the longitudinal axis of the clamping element is in the same direction as the inclination of the longitudinal axis of the clamping element in the clamping position to the axis of the clamped connecting element. The oblique slot has the advantage of pivoting the clamping element out of its clamping position already with a very small travel of the actuating pin.

This longitudinal slot offers special advantages for fixing connecting element which must not be damaged, e.g., thin wires. If only a bore were provided, damage to the clamped elements during their release might not be avoidable.

In the embodiment in FIGS. 61 through 63 there is shown a lock, in which the ends of a flexible element are connected, e.g., a chain, and more particularly an ornamental chain or necklace. A recess 152 of a preferably cylindrical housing 101 contains a drop-shaped clamping element 107, connected pivotably and tiltably with a compression spring 108, preferably a helical spring. The recess 152 has a cylindrical portion 152a and a conical portion 152b; the drop-shaped clamping element 107 is arranged in the conical portion 152b and clamps in the clamping position (FIG. 62) a spoon-shaped connecting element 153, having a configuration corresponding to that of the clamping element 107, tightening it against the conical wall portion of the part 152b. The connecting element is preferably integral with a connecting link 154, having an eye 155 with a recess 156. The recess 156 serves to mount the end of a flexible element, e.g., a wire or a chain.

The part 154, which is also cylindrical, is located in the clamping position (FIG. 62) with its left end in a cylindrical bore 157; this bore has a depth a, extending in the longitudinal direction of the clamping mechanism.

A cylindrical bush 130, surrounding the housing 101 completely, is arranged thereon, and is adapted to be moved between two positions. A compression spring 161, arranged between the housing 101 and a flange 161 of the bush 130, secures the bush in the clamping and coupling position. As shown, the spring 161 consists of a solid material, e.g., sponge rubber, but may also be a helical spring. According to the invention, springs made of synthetic resins may also be used.

A pin 162 passes through the clamping element 107 so that the latter may pivot and tilt thereabout. Both ends of the pin 162 pass outside the housing 101 and communicate with slots 163 with the length x of the bush 130. Two slots 164 at opposite sides of the housing permit these pins to pass therethrough.

As shown in FIG. 62, the slot 164 in the housing 101 is somewhat longer than the slot 163 in the bush 130, to enable the clamping element 107 to be fully disengaged from the spoon-shaped connecting element 153 by shifting the bush 130 to the left.

The left end of the housing 101 (as viewed in the drawing) has a connecting member 165 screwed thereinto; this member 165 is also cylindrical and has a recess 166 for the other end of the wire or chain. The spring 108 with its wider end facing the clamping element is mounted on the part 165.

The function of this embodiment, illustrated in FIGS. 61 through 63 is as follows:

FIG. 61 shows the closing or coupling position, in which the bush 130 is pushed by the spring 161 to the right so that the lug 154 with the connecting element 153 are retained immovably in the bore 157, having a depth a. The clamping effect is produced by wedging between the spoon-shaped connecting element 153 and the conical wall of the section 152b, and the drop-shaped clamping element 107. Release of the plug-in and clamping connection is not possible, because the connecting element cannot carry out the tilting movement necessary for the release; reliable connection is ensured even with strong tensile forces.

To release the locking action, the bush 130 is pushed to the left against the action of the spring 161 so that the member 154 is disengaged from the bore 157. It is important to move the bush 130 to the left by an amount which is slightly more than the axial depth of the bore 157, so that the lug 154 can carry out the tilting movement necessary to effect the release. To this end, the length x of the slot 163 of the bush 130 is greater than the axial depth a of the bore 157.

After the bush 130 has been shifted to the left by the amount x and rests with the right edge of the slot on the pin 162, the lug 154 with the spoon-shaped connecting element 153 is tilted downwards so that the clamping element 107 is pushed by the pin 162 to the left, when the bush 130 is pushed to the left. This enables the connecting element to be withdrawn towards the right from the interior 152 of the housing 101, opening the lock.

For closing the lock it is merely necessary to introduce the lug 154 with the spoon-shaped connecting element 153 under a slight tilting movement into engagement with the clamping element 107, releasing the bush, and thus securing the device in the coupling and clamping position.

The bush 130 has, on one hand, the advantage of a very simple operation, and on the other hand of a reliable securing of the lock against accidental release. It also covers the lock completely in the closed position.

Obviously, the connection shown in FIGS. 61–63 can be used wherever conventional plug-in and clamping connections are used. Preferably this type of closure is applied to ornamental chain, where perfect security against accidental release is of great importance.

A particularly simple and economical construction is obtained by making the spring 108 and the clamping element 107 integrally of a synthetic resin, e.g., of polyvinyl chloride, as shown in FIG. 52. The clamping element 107 may also be made as a hollow pressed and/or bent part (FIGS. 53 and 54) and may be combined with a compression spring of solid elastic material, such as sponge rubber, as shown in FIG. 56. The sponge rubber spring has a conical configuration with the cone tapering towards the clamping element.

As a modification of the embodiment shown in FIGS. 61 through 63, this may be constructed as a releasable electrical plug-in contact. To this end it is only necessary to provide the required number of electric contacts in the housing 101. The closure of this connection is made by engaging the single, spoon-shaped connecting element 453 with the clamping element 107. This construction is shown in FIG. 64a.

FIG. 64b shows a further modification of the electrical connector. Identical parts are indicated by the same reference numerals as in FIGS. 61 through 63, and the description of these parts has been omitted.

This construction comprises two spoon-shpaed connecting elements 153' of electrically conducting material, forming electrical plug-in contacts. In the closed position, these electrical contacts 153' are pressed against associated bushes 170 of electrically conducting material. The two bushes 170 are connected with the conducting cores of an electric cable 171, introduced from the left, and these cores are conveniently fixed by screwless plug-in contacts.

In a modification according to FIG. 63, the compression spring 161 of elastic material is not arranged on the right, but on the left side.

The operation of the device of FIG. 64b is obviously the same as in FIGS. 61 through 63. Obviously any number of contacts may be used. Furthermore, electrically conducting strips may replace the conducting bushes 170. Also printed circuits may be used.

The releasable clamping and plug-in connection according to the invention may also be used for safety belts of all types, particularly safety belts used in automobiles and aircraft. As already described, such a safety belt consists substantially of three sections, a shoulder section and a seat section being attached to a lock plate, and a second seat section carrying the lock. FIG. 65 shows a plug-in connector for safety belts according to the invention with bush operation; the same reference numerals are used as in FIGS. 61–63.

The safety belt arrangement of FIG. 65 differs from that shown in FIGS. 28 through 39 mainly in that the actuation is by means of a bush and in that the compression spring consists of a solid material. As with other safety belts, the housing 101 is not cylindrical but flat. The left end of the housing carries the end of a safety belt 180. The clamping elements—of which three are provided in this embodiment, the center one being drop-shaped and the other two bent flat members—are not in direct contact with the sponge rubber spring 108, but with a sliding member 181. The sliding member 181 is connected to the bush 130 by two actuating pins 182 engaging into slots 163 of the bush 130, the arrangement being such that, by virtue of a suitable mounting either of the sliding member 181 or of the clamping elements 107, the latter have a mobility enabling them to carry out a tilting movement, thus ensuring good contact with increased wedge and clamping effect.

The spoon-shaped connecting element, which is slightly modified compared with the embodiments described above, is adapted to the configuration of the safety belt lock. The connecting element in FIG. 65 is a bent flat member having a cross section similar to the connecting element shown in FIG. 62.

Obviously, the bush 130 is also adapted to the flat configuration of the safety belt lock. The function is the same as already hereinbefore described.

As a modification of this embodiment, it is also possible to clamp the right end of the safety belt 180 directly by means of the clamping element 107; to this end, there is provided a slot extending obliquely to the direction of movement of the sliding member 181 and of the clamping elements 107, into which slot the belt is fitted and retained by wedge action by releasing the bush 130.

In the arrangement of FIG. 65, comprising a solid material compression spring 108, all modifications shown in FIGS. 28 through 39 may be used.

The safety belt lock has all the advantages described in connection with the preceding embodiments. Compared with safety belts with serrated roller locks, extending over the entire width of the belt, and pressed thereagainst by a spring, there is the further advantage that the safety belt according to the invention cannot be cut, because the clamping elements are spaced apart over the width of the belt and the sections not affected by the clamping elements cannot therefore be cut. On the other hand, locally limited tear sections in the longitudinal direction of the belt are desirable, because they do not affect the resistance of the belt up to the end of the application of the stress.

FIG. 66 shows a further embodiment of the clamping device according to the invention, adapted to be used as multiple terminal.

This construction is operated by means of a central rod 143, connected with the individual springs which are preferably of plastics. The ends of the operating rod 143 carry each a sliding element 1444 adapted to be displaced in a slot 145 in the side face of the housing 101. The housing 101 is enclosed in a diaphragm 146 serving to cover and center the rod 143. An actuating ring 147 is provided in the zone of the two sliding elements 144 and clamps the diaphragm against the two sliding elements. By laterally displacing the operating ring 147, which movement is taken up by the elastic deformation of the diaphragm, the clamping elements 107 on one or the other side can be released at choice. Metal bushes 148 are provided to form the electrical connection between two facing cable ends.

In order to facilitate the clamping connections, especially in the arrangement shown in FIGS. 61 through 63, the clamping elements 107 may be provided with a slot instead of a bore, extending substantially in the longitudinal direction of the device, as indicated in FIG. 60e. If in this case the connection is released by moving the bush 130 towards the left, the actuating pin 162 first pivots the clamping element 107 out of its tilting clamping position, before the actual withdrawal is effected. This relieves substantially the clamping effect and facilitates the final release of the clamping action. Preferably, the slot is inclined to the longitudinal axis of the clamping element, the direction of the inclination being the same as that of the axis of the clamping element in the clamping position to the axis of the connecting element. The oblique slot has the advantage of moving the clamping element out of the clamping position already with a very small travel of the actuating pin, which produces a very easy release action.

Yet another device according to the invention, shown in FIG. 67, comprises a housing 101, preferably made of synthetic resin. The housing 101 has a recess 104, with a continuous cylindrical bore 105 for introducing two electrical conductors, and two bores 109, forming an oblique angle with the axis of the continuous bore 105. The said oblique bores 109 form oblique surfaces 120, enabling the two ends of the electrical conductors to be clamped tight in the housing by means of clamping elements 107.

Each of the two clamping elements 107 has a shank with a spherical end 107a and is tiltably mounted on an associated spring 108. These leaf springs 108 have each a curved leg 108a resting on an abutment A in the housing 101.

For actuating the leaf springs 108 in order to release the clamping action of the clamping elements 107, there is provided a handle grip 191, extending outwardly of the housing 101 through a slot 192. The handle grip 191 is firmly connected wit the two upper ends of the leaf springs 108. Within the handle grip 191, there is an electrically conducting strip 193, making from contact with the equally conducting upper ends of the two leaf springs 108.

The two ends of the handle grip 191 are each connected with a leaf spring 194, located in slots 195 in the housing 101. The mounting may comprise a sliding guide or a fixed mounting, proved that the handle grip is sufficiently resilient.

The operation of the above described device is as follows:

When the handle grip 191 is pushed down as viewed in the drawing, i.e., in the transverse direction, the two clamping elements 107 are pivoted by the associated legs 108a of the leaf springs and moved into the release position. Then, the two conductors can be introduced from opposite ends into the cylindrical bore 105 of the housing 101. When the handle grip is released, the ends of the conductors 190 are clamped tight, because the handle grip is pushed up by the action of the two leaf springs 194. This results in the clamping elements 107 to be pressed against the sloping surfaces 120 under simultaneous tilting into the clamping position in which they rest firmly on the electrical conductors 190. Moreover, in the clamping position, the lower ends of the leaf springs 108 are firmly pressed against the conductors 190 and make good electrical contact. The electric circuit is therefore closed via the two leaf springs 108 and the electrically conducting connecting element 193. A tensile stress affecting the conductor increases the clamping effect and ensures absolute reliability against withdrawal of the conductor, even under very high tensile stresses.

If the handle grip is not pushed down, but shifted to the left or right, i.e., in the direction of the axis, either the left or the right-hand conductor can be released, because this action will affect only one of the leaf springs and release only the associated clamping element.

As shown in FIG. 67, the device is symmetrical relative to its center plane.

In the arrangement of FIG. 68, several devices according to FIG. 67 are combined in one plastic housing, forming a multiple terminal element.

Obviously, the device according to the invention is not limited to electrical conductors, but may be used for releasably connecting ropes, cables and the like.

As a modification of the embodiment in FIG. 67, the two leaf springs 108 and the electrically conducting connecting strip may be made in one piece, forming a combination of the parts 108 and 193. Moreover, also the leaf springs 108 and the associated clamping elements 107 may be made integrally in one piece. In this case, the clamping elements 107 are hollow bent and/or pressed parts.

FIG. 69 shows a further preferred embodiment, similar to that in FIG. 67, but differing in the following points.

The two leaf springs 108 are made integrally with the two clamping elements 107, which are serrated along the clamping surface. In order to provide double safety and double contact, each leaf spring 108 is provided with a locking and safety hook 108b resting in the clamping position firmly on the connecting element. Preferably, the hooks 108b are also made in one piece with the leaf springs 108 and with the clamping elements 107.

As already mentioned, the locking hook 108b gives the additional advantage of double safety, as well as double contact; the latter is important in view of the fact that safety regulations frequently specify double contacts for currents exceeding 16 amperes. If the connecting element is expose to a tensile stress, the clamping element is pulled further into its wedge-shaped seating, and simultaneously, the leaf springs and hooks 108, 108b are pressed more strongly on to the connecting element, i.e., the stronger is the tension, the stronger is also the locking effect.

A covering member 101' is mounted pivotably on the housing 101 and may be moved by a handle 191 into the position shown in FIG. 69. In this position, the handle grip is covered and secured against accidental release. Moreover, two pins may be provided to this end instead of the cover 101' which prevent the leaf springs from sliding in the slots 195.

It should be noted that the clamping element is pivotably and tiltably connected with the leaf spring, but nevertheless well retained and guided thereby, particularly in view of the technical requirement that, after the fitting, the connecting element must not be capable of being withdrawn by more than about one-twentieth to one-tenth of an inch. This requirement may be met, for example, in that the shank of the clamping element has a substantially vertical, cylindrical pin, which engages into a forked end of the leaf spring and is pivotably and tiltably located therein, as shown in FIG. 60b. By virtue of this mounting, the clamping element cannot move relative to the leaf spring, e.g., during the introduction of a connecting element into the device.

The locking hook may also be arranged separately from the leaf spring.

The invention is not limited to the embodiments hereinbefore described, which serve merely as illustration, and can be modified in many ways without thereby departing from its principle.

I claim:

1. A device for releasably clamping at least one connecting element, having housing provided wit at least a first an at least a second oblong recess, whereby the two recesses are connected to one another and form a sharp angle with respect to one another with their longitudinal axes, in which there is provided in the first oblong recess at least one pressure spring with at least one associated clamp biased by the pressure spring, the second oblong recess being continuous and substantially rectilinear and taking up the associated connecting element, said continuous oblong recess having an inlet and an outlet opening for the connecting element, said clamp being pressed in the direction of the associated opening in the outer wall of the housing, at least one continuous slot in said housing extending from said opening along the length of the housing for introduction of an endless connecting element into said housing, the continuous slot communicating with the associated continuous oblong recess, at least one activating device accessible from outside the housing constituting means for pushing back the clamp against the bias of the associated pressure spring, means tiltably connecting said clamp to the associated activating device so that when the activating device is moved to a release position, the clamp is tilted away from contact with the connecting element.

2. A device as set forth in claim 1, wherein the said opening is a cylindrical bore and the recess for said clamping element is a cylindrical blind bore extending obliquely to the cylindrical bore for said connecting element and forms said sharp angle.

3. A device as set forth in claim 2, wherein the spring is a helical spring, arranged in a bore parallel to the opening and communicating with the said blind bore.

4. A device as set forth in claim 1, wherein the spring is a substantially L-shaped leaf spring, of which one leg is straight and the other leg arcuately curved.

5. A device as set forth in claim 4, wherein the end of the arcuate leg of the spring retains the clamp in an articulate manner and the end of the straight leg is firmly connected with the housing.

6. A device as set forth in claim 5, wherein the arcuate leg of the spring rests on an abutment in the housing.

7. A device as set forth in claim 1, wherein the activating device is a wire member, passing through a slot in the housing and carrying a grip roller outside the housing for releasing the said clamping element.

8. A device as set forth in claim 1, wherein the clamp has a bore for inserting an actuating tool serving as said activating device.

9. A device as set forth in claim 1, wherein a pin passes through the clamp, about which the said clamp is pivotable, and an actuating handle connected to the said pin serves as said activating device.

10. A device as set forth in claim 9, wherein the said handle consists of a bush mounted displaceably on the housing and at least partially surrounding the same.

11. A device as set forth in claim 1, including a bush mounted displaceably on the housing and connected with the spring serving as the activating device.

12. A device as set forth in claim 1, wherein the clamp and the spring are made integrally of synthetic resin.

13. A device as set forth in claim 1, wherein the clamp is a hollow pressed part and is connected integrally with the spring in the shape of a leaf spring.

14. A device as claimed in claim 1, wherein the spring is of solid elastic material.

15. A device as set forth in claim 14, wherein the said elastic solid material has a conical configuration, wherein the cone tapers in the direction towards the clamp.

16. The device of claim 1, in which the clamp is curved along the surface which touches the housing to facilitate tilting.

17. The device of claim 1, having two openings for connecting elements and two clamps interconnected by a pressure spring of elastic material having the shape of a double cone.

18. The device of claim 17, including an electrically conducting means running between said two clamps.

19. The device of claim 18 having several clamps arranged side by side and interconnected in pairs by springs including an activating device connected to all the springs.

20. The device of claim 19, including a diaphragm which encloses part of the housing and serves to center the activating device.

21. The device of claim 1, in which said first oblong recess extends obliquely to said second oblong recess and said activating device is a pin extending from said clamp through said housing.

22. A device as set forth in claim 1, wherein the said spring is a leaf spring equipped with a locking hook which is pressed against a fixed connecting element in the clamping position to cause double safety and double contact.

23. A device as set forth in claim 1, including means for securing the activating device against accidental release.

24. A device as set forth in claim 23, wherein the securing means comprise a spring acting transversely of the release direction and pushing the activating device into a bayonet shaped recess.

25. A device as set forth in claim 24, comprising a magnet acting across the release direction and supporting the force of the spring.

26. The device of claim 1, in which the means tiltably connecting the clamp to the activating device is a neck extending from said clamp with an enlarged portion on its distal end, an angled slot in said activating device holding said enlarged portion within it but permitting sliding movement of the neck in the slot so as to facilitate tilting of the clamp when the activating device is moved.

27. The device of claim 1, including means to close said continuous slot comprising a cover extending longitudinally along at least part of said housing and slidably moveable transversely thereof to open and close said slot.

28. The device of claim 27, including biased locking means to hold said cover in position when closed.

29. The device of claim 1, in which said continuous slot follows a curved path.

30. The device of claim 1, in which said continuous slot follows a labyrinthian path.

31. The device of claim 1, including means to close at least part of said continuous slot, said means at least partly enclosing said housing and moveable to uncover and cover said slot to permit insertion of and prevent escape of said connecting element.

* * * * *